(12) United States Patent
Shabtai et al.

(10) Patent No.: US 12,512,635 B2
(45) Date of Patent: Dec. 30, 2025

(54) STACKABLE POWER OUTLET BOX

(71) Applicant: The Stanley Works Israel Ltd., Rosh Ha'Ayin (IL)

(72) Inventors: Yotam Shabtai, Kfar-Sava (IL); Amit Ran, Mazkeret Batia (IL); David Riesenberg, Rehovot (IL); Ohad Waissengreen, Emek Sorek (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 455 days.

(21) Appl. No.: 18/083,644

(22) Filed: Dec. 19, 2022

(65) Prior Publication Data

US 2023/0238755 A1  Jul. 27, 2023

Related U.S. Application Data

(60) Provisional application No. 63/267,124, filed on Jan. 25, 2022.

(51) Int. Cl.
*H01R 25/00* (2006.01)
*B65H 75/40* (2006.01)
(Continued)

(52) U.S. Cl.
CPC ........... *H01R 25/006* (2013.01); *B65H 75/40* (2013.01); *B65H 75/4471* (2013.01);
(Continued)

(58) Field of Classification Search
CPC ...... H01R 25/006; H01R 31/02; B65H 75/40; B65H 75/4471; B65H 2701/34
See application file for complete search history.

(56) References Cited

U.S. PATENT DOCUMENTS

| | | | | |
|---|---|---|---|---|
| 5,700,150 A | * | 12/1997 | Morin | H01R 25/003 439/4 |
| 5,855,262 A | * | 1/1999 | Jackson | B65H 75/425 242/378.1 |

(Continued)

FOREIGN PATENT DOCUMENTS

| | | |
|---|---|---|
| DE | 20218996 U1 | 3/2003 |
| DE | 102015013053 A1 | 4/2017 |

(Continued)

OTHER PUBLICATIONS

European Search Report dated Jun. 20, 2023 in corresponding European application No. 23152362.2, 13 pages.

*Primary Examiner* — Harshad C Patel
(74) *Attorney, Agent, or Firm* — Mintz, Levin, Cohn, Ferris, Glovsky and Popeo, P.C.

(57) ABSTRACT

A stackable storage system is disclosed. The system includes a base storage container disposed on a wheeled cart, and one or more additional storage containers removably secured on top of the base container. The system further includes a power outlet box which is interchangeably securable in the system with the other storage containers. The power outlet box includes an extendable AC power cord which may be plugged into a wall outlet, and one or more electrical output plugs, include AC outlets and USB outlets which are powered by the AC power cord. The power outlet box and other containers are securable to each other by a spring loaded latch system. The power outlet box is also usable separate with a storage container having an overhead carry handle allowing both the container and power box to be transportable together.

20 Claims, 24 Drawing Sheets

(51) Int. Cl.
*B65H 75/44* (2006.01)
*H01R 31/02* (2006.01)
*H05K 5/02* (2006.01)
*H05K 5/30* (2025.01)

(52) U.S. Cl.
CPC ............ *H01R 31/02* (2013.01); *H05K 5/023* (2013.01); *H05K 5/30* (2025.01); *B65H 2701/34* (2013.01)

(56) References Cited

U.S. PATENT DOCUMENTS

| | | | |
|---|---|---|---|
| 5,906,381 A | 5/1999 | Hovatter | |
| D448,730 S * | 10/2001 | Lee | D13/139.7 |
| 6,341,875 B1 * | 1/2002 | Chu | F21S 4/20 |
| | | | 362/249.14 |
| 6,347,847 B1 * | 2/2002 | Tiramani | B65H 75/403 |
| | | | 280/47.35 |
| 6,439,360 B1 * | 8/2002 | Miller | H02G 11/02 |
| | | | 191/12.4 |
| 7,263,742 B2 * | 9/2007 | Valentini | A47L 9/009 |
| | | | 15/327.2 |
| 8,132,819 B2 | 3/2012 | Landau et al. | |
| 8,876,560 B2 * | 11/2014 | Thompson | B65H 75/14 |
| | | | 439/709 |
| 9,132,543 B2 | 9/2015 | Bar-Erez et al. | |
| 9,381,639 B2 * | 7/2016 | Werner | B25H 3/02 |
| 9,463,701 B2 * | 10/2016 | Hakeem | B60L 53/18 |
| 10,002,379 B2 * | 6/2018 | Goto | H01M 50/247 |
| 10,044,203 B2 * | 8/2018 | Ergun | G06F 1/189 |
| RE47,022 E * | 9/2018 | Sosnovsky | B65D 45/22 |
| 11,219,290 B2 * | 1/2022 | Robinson | H02S 10/40 |
| 11,794,952 B2 * | 10/2023 | Brunner | A45C 13/02 |
| 2002/0030425 A1 | 3/2002 | Tiramani et al. | |
| 2004/0087207 A1 * | 5/2004 | Lerch | H01R 13/72 |
| | | | 439/502 |
| 2008/0035507 A1 * | 2/2008 | Collister | B25H 3/006 |
| | | | 206/349 |
| 2020/0025229 A1 | 1/2020 | Baruch et al. | |
| 2020/0171646 A1 | 6/2020 | Liu | |
| 2020/0284425 A1 | 9/2020 | Plato et al. | |
| 2022/0094185 A1 * | 3/2022 | Ran | B25H 3/02 |

FOREIGN PATENT DOCUMENTS

| | | |
|---|---|---|
| EP | 1424170 A1 | 6/2004 |
| GB | 2406331 A | 3/2005 |
| JP | H10337680 A | 12/1998 |

* cited by examiner

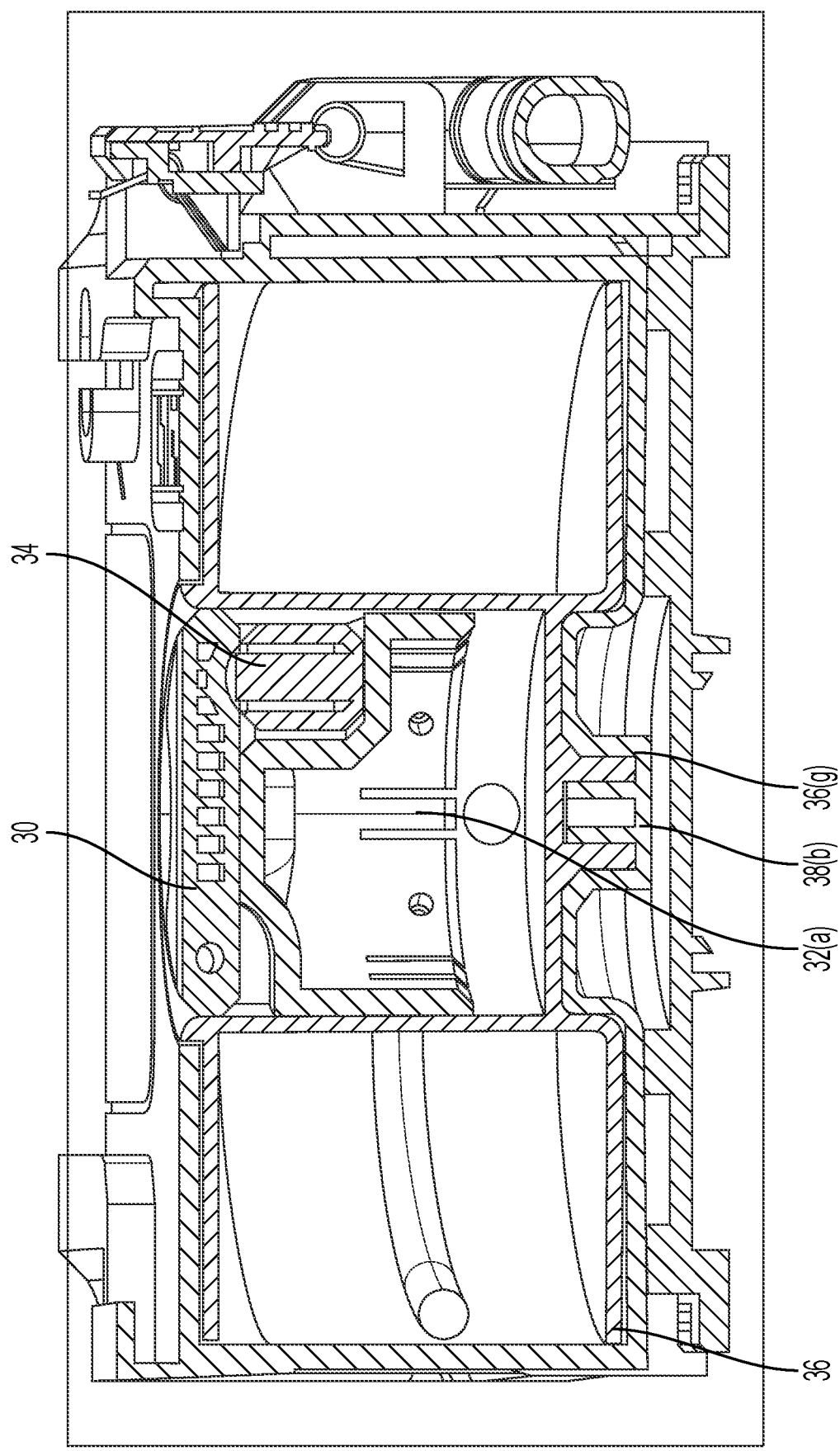

STACKABLE POWER OUTLET BOX

CROSS-REFERENCE TO RELATED APPLICATIONS

This application claims priority to U.S. Provisional Patent Application Ser. No. 63/267,124 filed Jan. 25, 2022, which is incorporated herein by reference in its entirety.

FIELD OF THE INVENTION

The present invention relates to stackable storage container systems, including systems which are handheld for joint transport or which include a plurality of storage containers which may be secured to each other for joint movement by a wheeled cart.

BACKGROUND

Stackable storage containers are known, for example, the rolling container assembly shown in U.S. Pat. Nos. 8,132,819 and 9,132,543, which are hereby incorporated by reference. The assembly disclosed therein includes a base storage container which is disposable on a cart which is provided with wheels and an integral handle system. At least one further storage container may be removably attached on top of the base container, allowing for multiple containers to be jointly transported. The mechanism for attaching the containers to each other may include a stacking latch mechanism, for example, as shown in U.S. Patent Application Publication No. 2020/0025229 which is hereby incorporated by reference. The mechanism includes a spring loaded pivotable latch having a hook disposed on the lid of the container and a step formed on the lower housing of the container. The latch is spring biased towards an inward position. When the base of a second such container is disposed on a first such container the step of the second container contacts the hook and pushes the latch outwardly to allow the step to pass by. Once the step has cleared the hook, the latch moves inwardly under the spring bias so as to dispose the hook over the step and thereby secure the containers together.

SUMMARY OF THE INVENTION

In one embodiment the invention is directed to a power outlet box comprising a housing including an opening. A rotatable drum is disposed in the outlet box housing. A power cord is windable about the rotatable drum and includes an AC plug at one end. The power cord is disposed through the opening and is extendable with the drum rotating in an unwinding direction. At least one power outlet is disposed on the housing and is electrically powered by the power cord when the power cord is inserted in a wall outlet. An outlet box latch is disposed along one side of the outlet box housing. The outlet box latch is removably disposable over a step formed in a second housing to thereby removably secure the second housing to the outlet box housing.

In a second embodiment, the invention is directed to a stackable container system including a power outlet box and a storage container. The power outlet box includes an outlet box housing including an opening, a rotatable drum disposed in the outlet box housing, and a power cord windable about the rotatable drum and including an AC plug at one end. The power cord is disposed through the opening and is extendable with the drum rotating in an unwinding direction. The invention further includes at least one power outlet disposed on the outlet box housing and electrically powered by the power cord when the plug is inserted in a wall outlet. The storage container further includes a plurality of storage container walls defining an open upper surface and an interior storage volume and a storage container handle secured to the storage container and rotatable between a position above the open upper surface and a position along at least one of the storage container walls. The outlet box housing is removably disposable on the storage container walls so as to be supported in the open upper surface and above the interior storage volume with the storage container and power outlet box jointly carriable by the storage container handle.

In a third embodiment, the invention is directed to a stackable container system including a power outlet box and a storage container. The power outlet box includes an outlet box housing having an opening, a rotatable drum disposed in the outlet box housing and a power cord windable about the rotatable drum and including an AC plug at one end. The power cord is disposed through the opening and is extendable with the drum rotating in an unwinding direction. At least one power outlet is disposed on the outlet box housing and is electrically powered by the power cord when the AC plug is inserted in a wall outlet. The storage container includes a plurality of storage container walls defining an interior storage volume. The storage container and the power outlet box are removably securable to each other.

These and other objects, features, and characteristics of the present invention, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural references unless the context clearly dictates otherwise.

BRIEF DESCRIPTION OF THE DRAWINGS

FIG. 5F is a cross-sectional view of the of the stackable power outlet box shown in FIG. 5A.

DETAILED DESCRIPTION OF EXEMPLARY EMBODIMENTS

Figure 1:
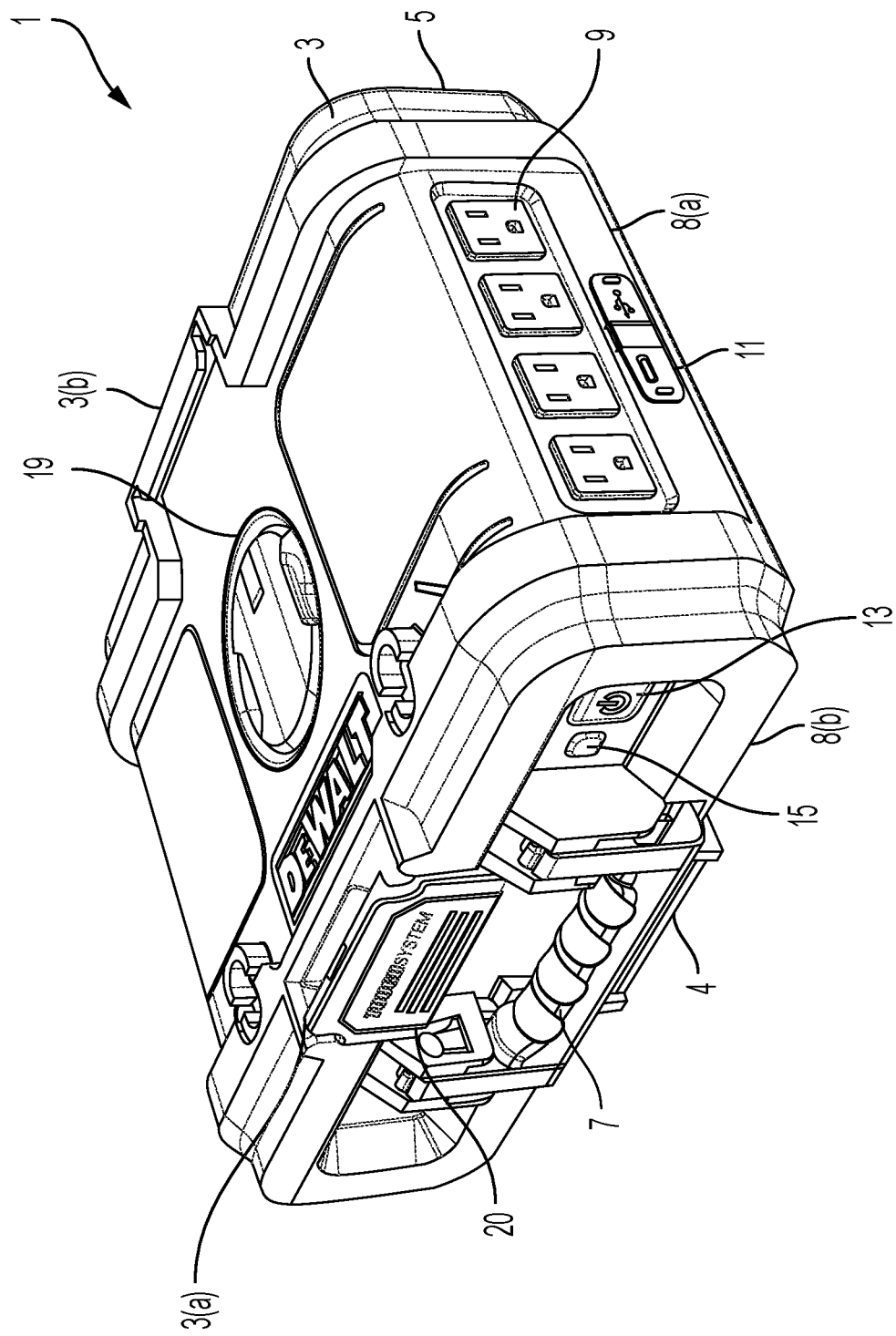
FIG. 1 is a top perspective view of a stackable power outlet box according to a first embodiment of the invention.
Figure 2:
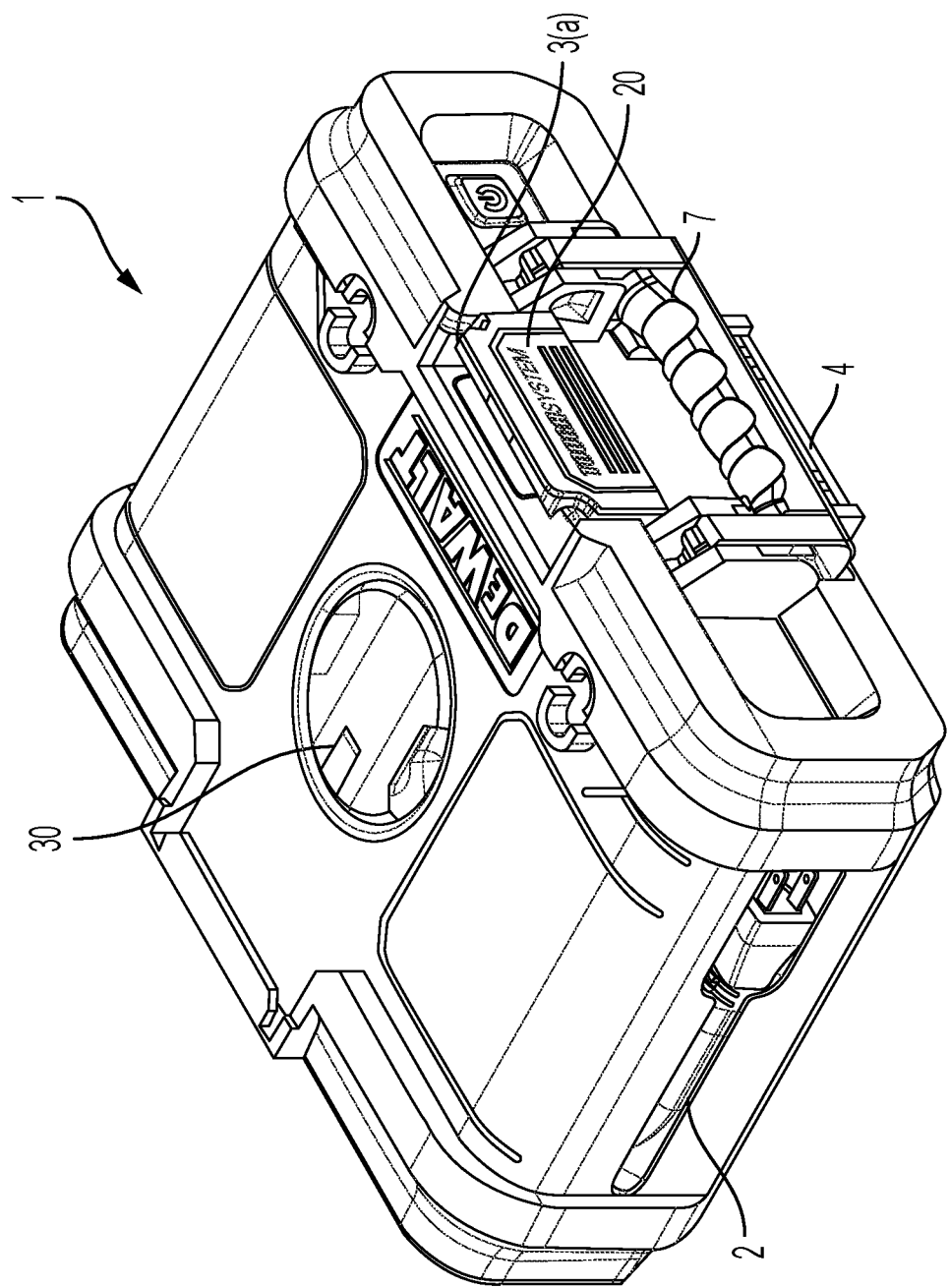
FIG. 2 is an opposite top perspective view of the stackable power outlet box shown in FIG. 1.
Figure 3:
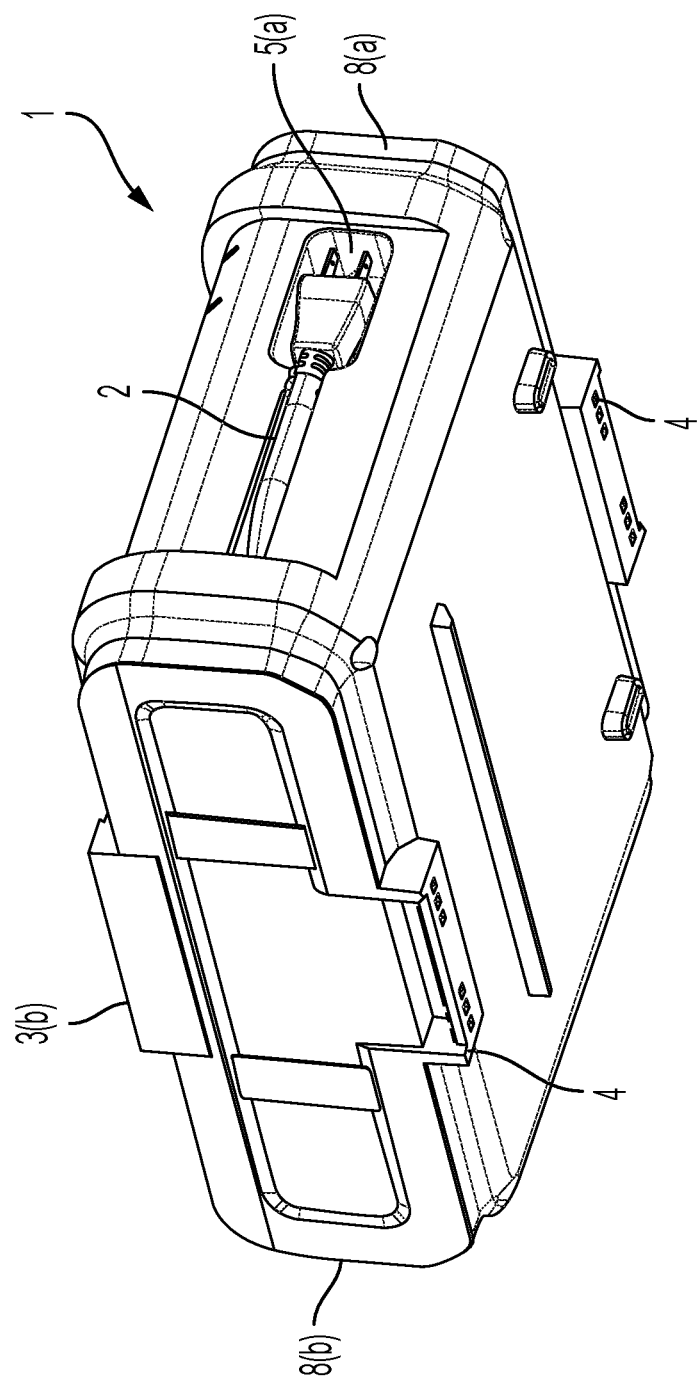
FIG. 3 is bottom perspective of the stackable power outlet box shown in FIG. 1.
Figure 4:
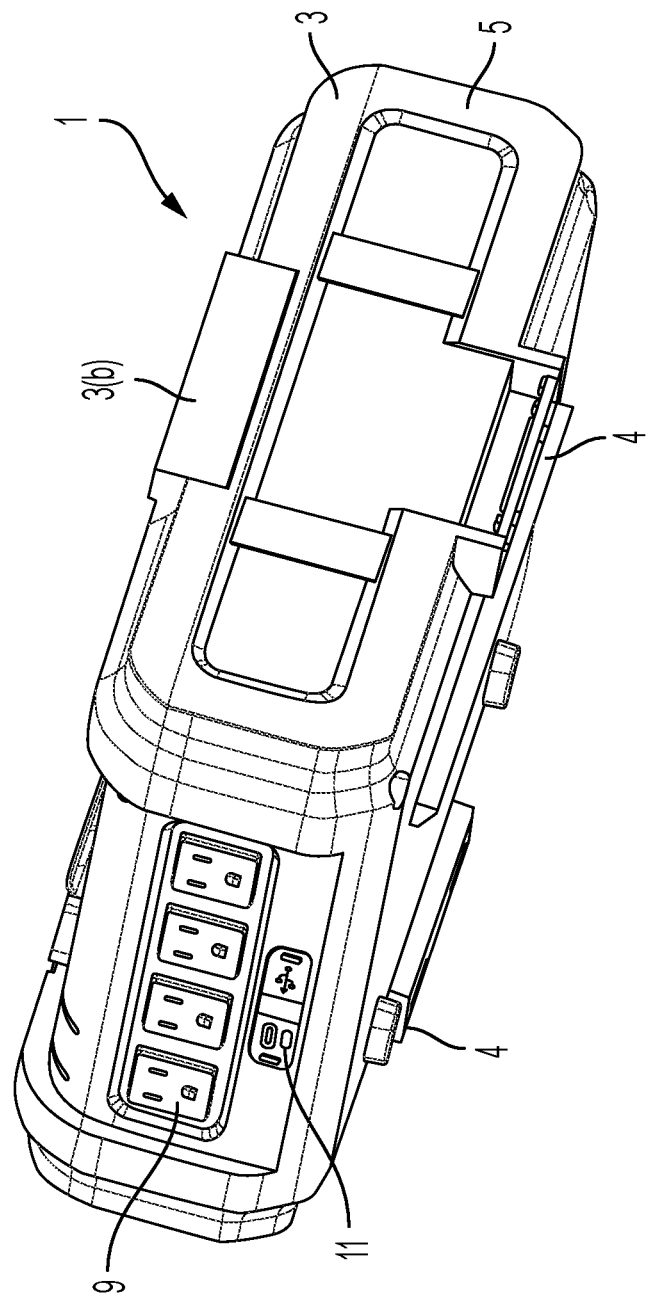
FIG. 4 is an opposite bottom perspective view of the stackable power outlet box shown in FIG. 1.
Figure 5A:
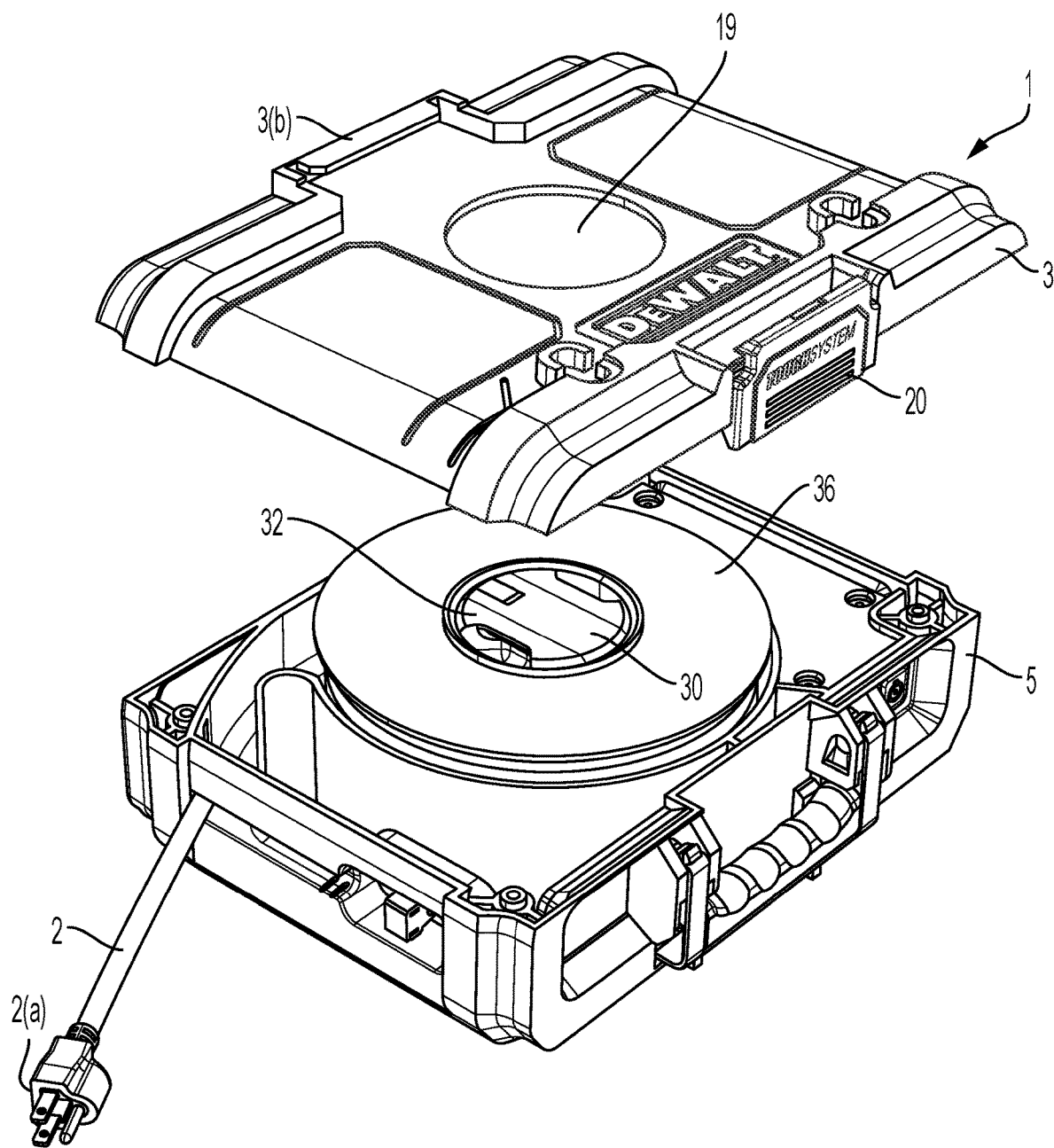
FIG. 5A is a perspective view of the stackable power outlet box shown in FIG. 1 partially exploded to show the interior thereof.
Figure 5B:
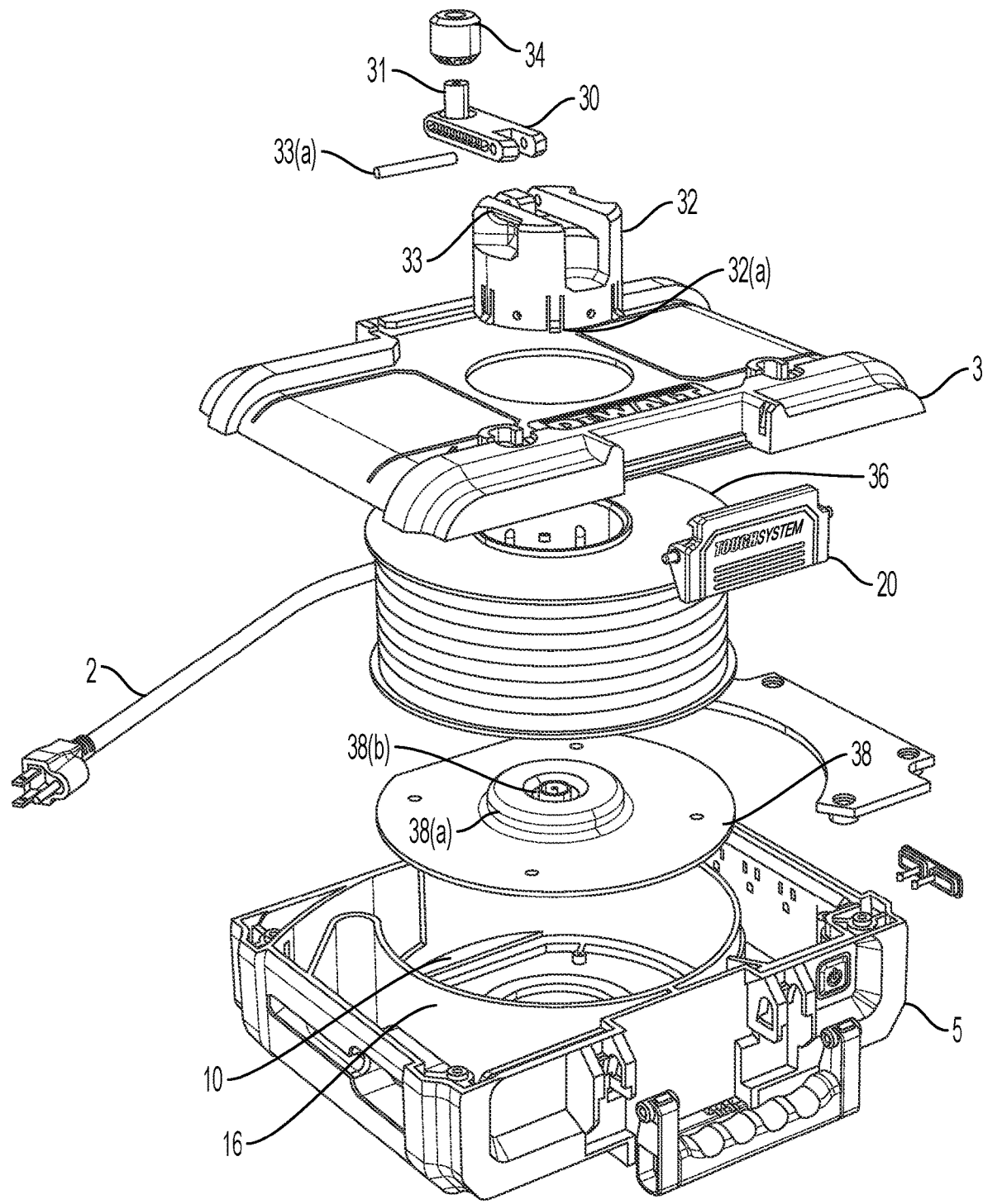
FIG. 5B is an exploded perspective view of the stackable power outlet box shown in FIG. 5A.
Figure 5C:
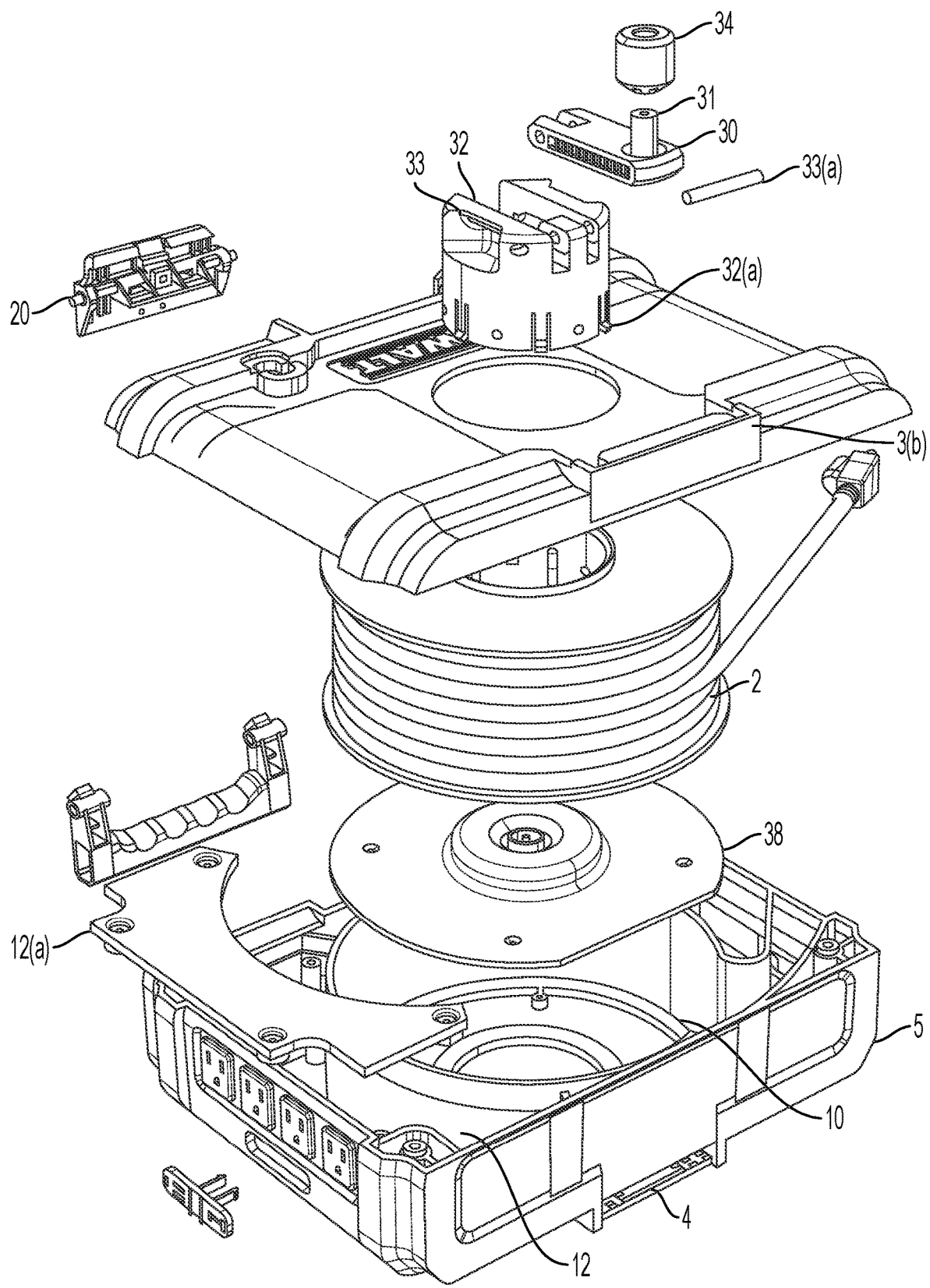
FIG. 5C is an exploded perspective view of the stackable power outlet box shown in FIG. 5A from the opposite side.
Figure 5D:
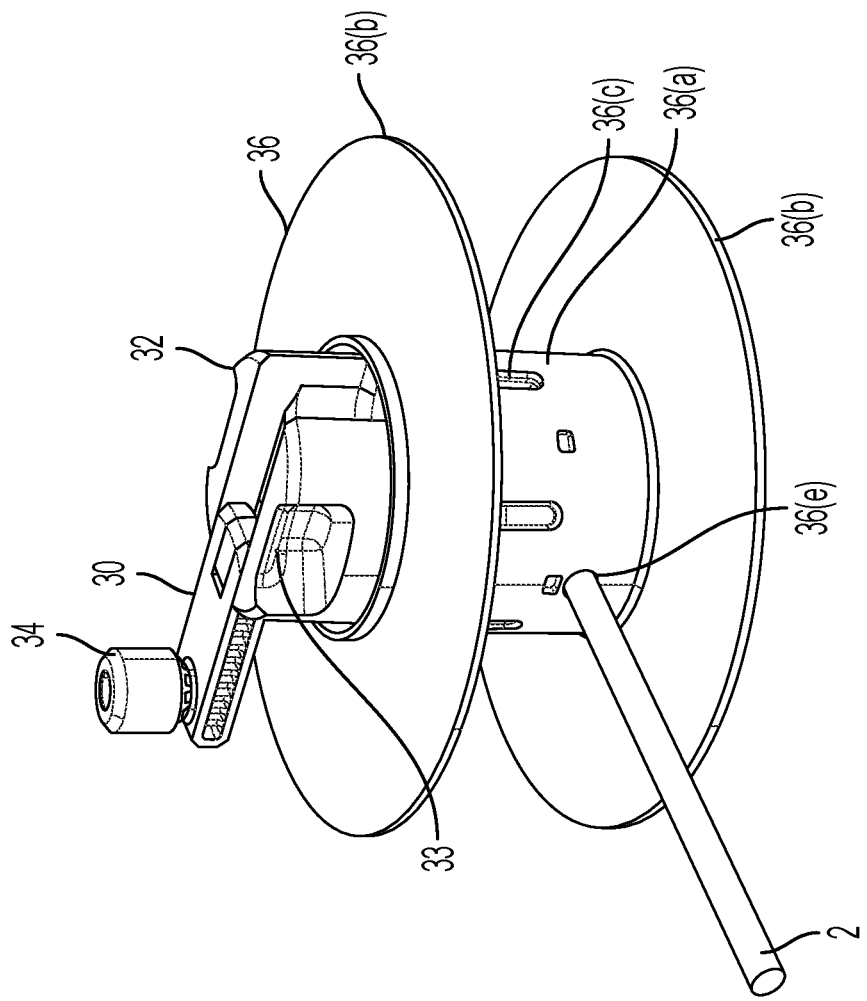
FIG. 5D is a closeup view of a drum forming part of the stackable power outlet box shown in FIG. 5C.
Figure 5D:
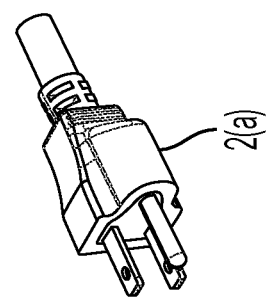
Figure 5E:
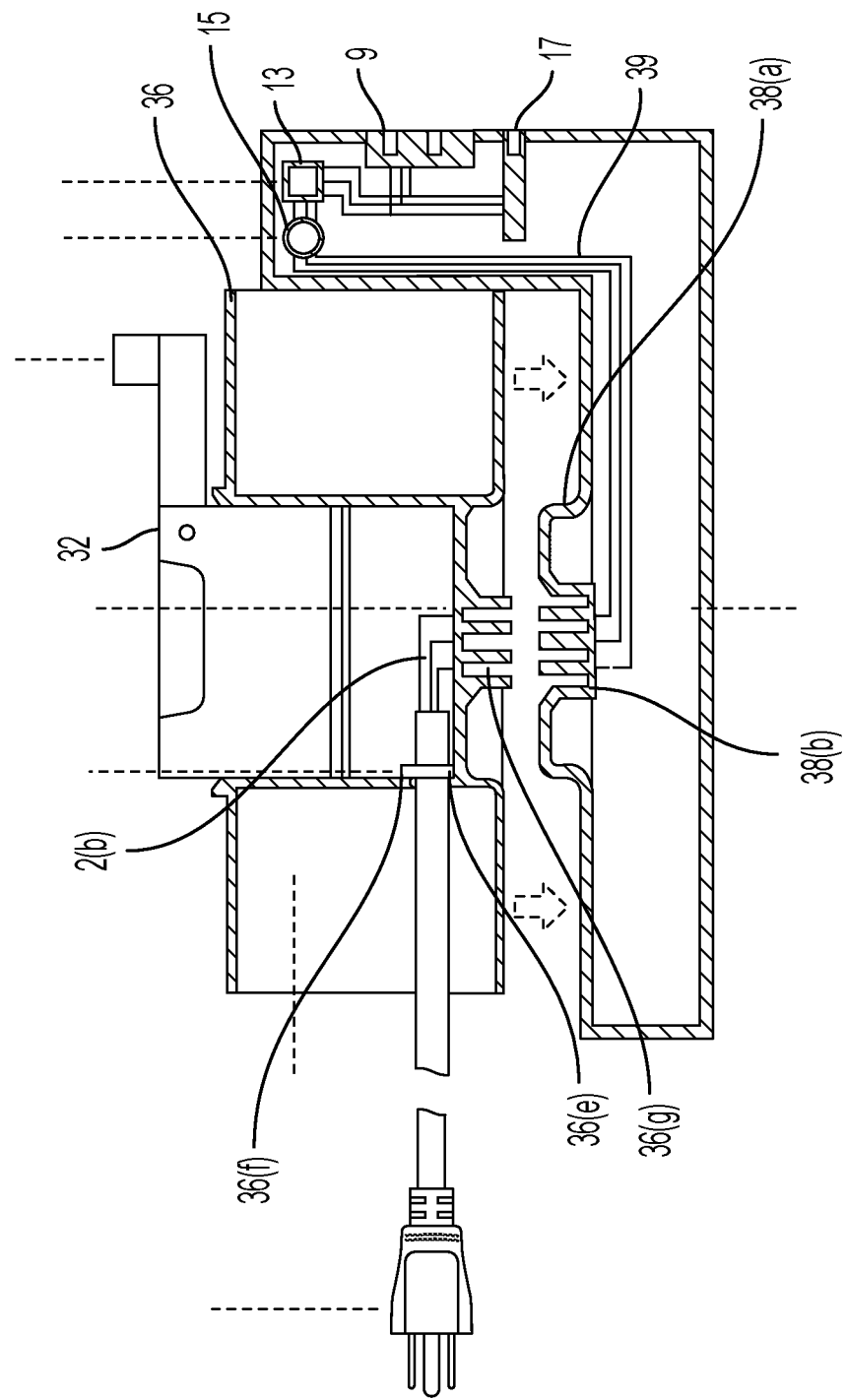
FIG. 5E is a partial cross-sectional view of the stackable power outlet box shown in FIG. 5A showing certain elements thereof in diagram format.
Figure 6:
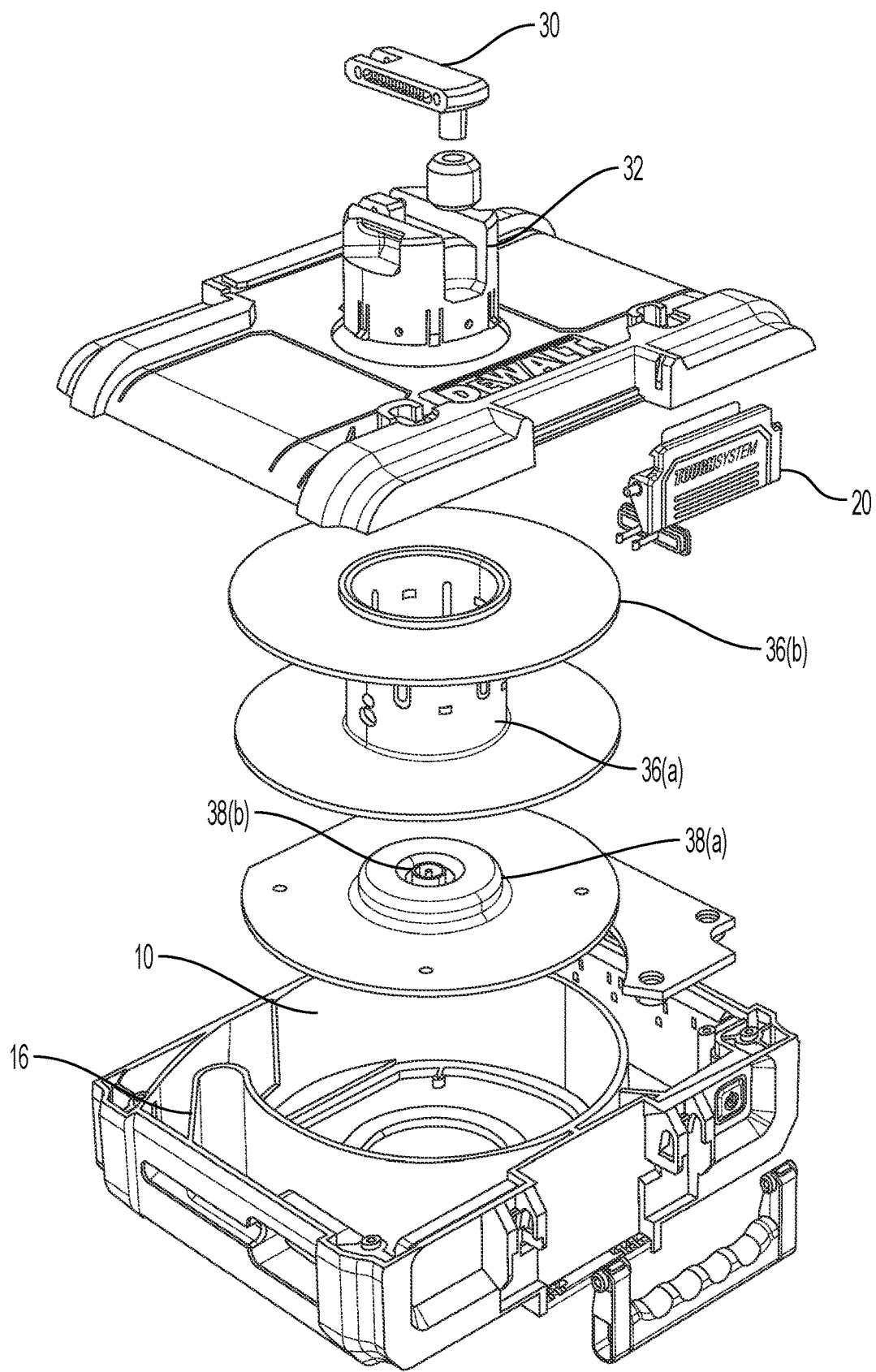
FIG. 6 is an exploded view showing elements of the stackable power outlet box shown in FIG. 1.

With reference to FIGS. 1-6 stackable power outlet box 1 includes upper housing 3 disposed on lower housing 5 to enclose an interior volume. Circular interior wall 16 is disposed within and divides the interior volume into drum chamber 10 and electronics chamber 12. Circular interior wall 16 includes vertical opening 16(a) disposed therethrough. Stackable power outlet box 1 defines a pair of opposite and substantially parallel long sides 8(b) and short sides 8(a). Four electrical AC outlets 9 are disposed on lower housing 5 on one of short sides 8(a) adjacent electronic chamber 12. USB charging ports 17 are disposed on lower housing 5 below AC outlets 9 and are covered by USB port cover 11. AC outlets 9 and USB ports 17 both provide electrical power and are jointly considered as power outlets. On/off switch 13 and overload reset button 15 are disposed on one of long sides 8(b) along with pivotable carry handle 7. AC cord 2 extends through a second short side 8(a) and suitable electronics are provided to electrically link AC cord 2 to USB charging ports 17 and AC outlet ports 9 so as to provide current thereto, and is controlled by on/off switch 13, as described further below. Electronics chamber cover 12(a) is secured over electronics chamber 12.

Stackable power outlet box 1 further includes latch system 20 disposed in a recessed area 3(a) formed on upper housing 3 at a location above carry handle 7 on one long side 8(b). Raised edge 3(b) having a portion which overhangs the upper surface of upper housing 3 extends along and is formed on the upper surface of upper housing 3 on the opposite long side 8(b). Lower housing 5 further includes two steps 4 formed on and projecting from a lower surface thereof. One step 4 is formed on one long side 8(b) below carry handle 7 and the other step 4 is disposed on the other long side 8(b) at a location below raised edge 3(b) and opposite of first step 4. Steps 4 each include lower and side walls extending from lower housing 5 to define an open volume. Cylindrical opening 19 is formed through the top of upper housing 3 substantially above drum chamber 10.

Slip ring 38 is disposed within drum chamber 10 and includes a plurality of openings which are disposed about upwardly extending screw bosses formed on the inner surface of lower housing 5 and is secured to the inner surface via screws. Drum 36 is disposed within chamber 10 and includes central cylinder 36(a) and upper and lower discs 36(b) which define a cord winding volume therebetween. Slip ring 38 includes upper projection 38(a) which fits within lower disc 36(b) so as to allow central cylinder 36(a) to be rotatably disposed on the upper surface of slip ring 38. Central cylinder 36(a) includes a plurality of vertically extending openings 36(c). Winding handle body 32 is generally cylindrical and is vertically slidably disposed within central cylinder 36(a) and includes spring tabs 32(a) which fit within vertical openings 36(c) to allow winding handle body 32 to be moved vertically relative to cylinder 36(a) for a limited extent while also mechanically joining winding handle body 32 and central cylinder 36(a) so that they jointly rotate with each other within drum chamber 10.

AC cord 2 is wrapped about drum central cylinder 36(a) and extends through opening 16(a) of circular interior wall 16 and through an opening in short side wall 8(a). Recess 5(a) is formed in short side wall 8(a) into which the trailing end of AC cord 2 and AC plug 2(a) may be secured when power outlet box 1 is not in use. AC cord 2 is electrically linked at its opposite end to the electronics as described further below. AC cord 2 is also secured to drum 36 such that rotation of drum 36 allows AC cord 2 to be rewound. AC cord 2 may be unwound by pulling on the exposed end thereof which is exterior of lower housing 5.

Cylindrical winding handle body 32 includes handle grips 33 formed on the upper surface thereof and which take the form of overhangs disposed in a recessed region. A plurality of spring tabs 32(a) are formed about the lower periphery of cylindrical winding handle body 32. When cylindrical winding handle body 32 is in its lower position handle grips 33 are exposed through cylindrical opening 19 in upper housing 3. Pivot rod 33(a) extends between handle grips 33. Handle 30 includes openings which receive pivot rod 33(a) and is thereby pivotably disposed on winding handle body 32 between a position in which it lies within a channel formed on the upper surface of winding handle body 32 and a position in which it is raised outward of the channel and into a winding position which lies at 180 degrees to its original position. Handle 30 includes projection 31 and grip knob 34 is disposed thereon.

Figure 7C:
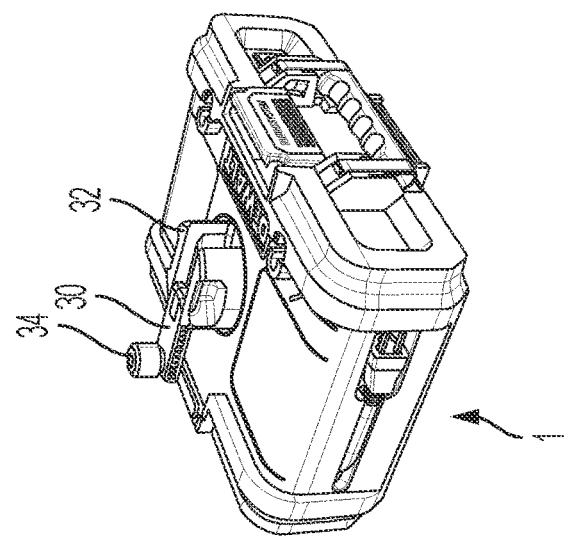
FIGS. 7A-7C are perspective views of the stackable power outlet box showing the winding mechanism thereof in various positions.
Figure 7B:
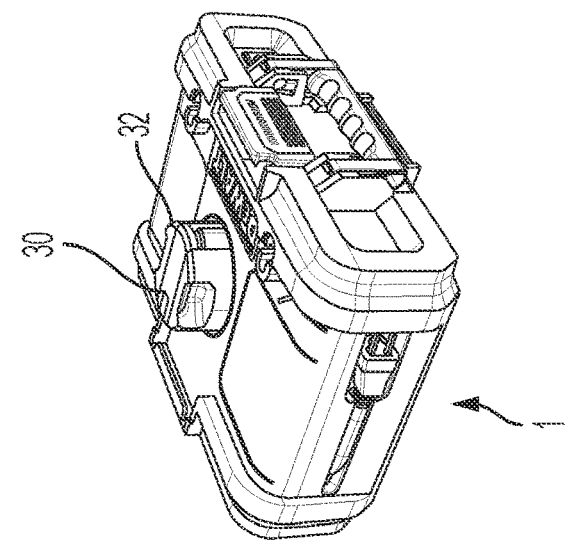
Figure 7A:
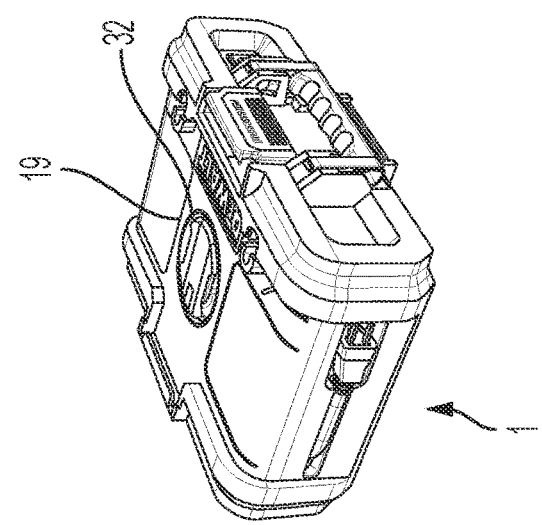

With reference to FIGS. 7A-7C the functioning of handle 30, handle winding body 32 and drum 36 are shown. AC power cord 2 may be extended by pulling it outwardly from side 8(a) to the desired extent, with drum 36 rotating as necessary. Winding handle body 32 and handle 30 also rotate with drum 36 due to the mechanical connection of spring tabs 32(*a*) disposed within vertical openings 36(*c*). AC power cord plug 2(*a*) may be plugged into an available power outlet to provide power to AC outlets 9 and USB ports 17, which can be used to power external devices such as power tools, phones or other devices which make use of AC power or a USB cable. As shown in FIG. 7A, winding handle body 32 remains in its initial lower position where it is fully retracted into central cylinder 36(*a*) of drum 36. When it desired to retract AC power cord 2 back into power outlet box 1, as shown in FIG. 7B, winding handle body 32 is raised by use of handle grips 33 so as to move it vertically upward through opening 19, with spring tabs 32(*a*) riding upwardly in vertical openings 36(*a*). In FIG. 7C, handle 30 is free from the upper surface of upper housing 3 and has been pivoted to its winding position about pivot rod 33(*a*). Knob 34 can then be gripped to rotate winding handle body 32 and thus drum 36 to retract AC power cord 2 into power outlet box 1. When AC cord 2 is fully extended, power outlet box 1 may be disposed a significant distance from an available AC wall outlet, for example, AC power cord 2 may be fifty feet long.

FIGS. 5A-5F show the manner in which AC cord 2 is mechanically linked to drum 36 to allow for extension and retraction of thereof, and the manner in which AC cord 2 is electrically linked with each of AC outlets 9 and USB charging ports 17 so that stackable power outlet box 1 may act as a power strip to provide power to multiple AC devices as well as to provide charging to devices with corresponding USB ports. AC cord 2 extends through opening 36(*e*) formed through central cylinder 36(*a*) and is secured thereon via cable stopper 36(*f*) which is both secured onto the exterior surface of AC cord 2 and lodged within the central interior volume defined by central cylinder 36(*a*) and rests against the inner surface of central cylinder 36(*a*). Cable stopper 36(*f*) prevents the inner end of AC cord 2 from becoming disconnected from central cylinder 36(*a*) during unwinding and provides a physical connection between AC cord 2 and central cylinder 36(*a*) during winding. Standard electrical wires 2(*b*) of AC cord 2 extend from the inner end and are connected to conducting elements disposed in three cylindrical openings 36(*g*) which are defined by cylindrical walls extending downwardly from the lower surface of lower surface 36(*b*) of drum 36. Standard electrical wires 39 are disposed within lower housing 5 and one end of each wire 39 is electrically connected to conductors on the ends of cylinders 38(*b*) which are defined by walls projecting upwardly from the surface of slip ring 38 radially within upper projection 38(*a*). At the other end, wires 39 extend into electronics housing 12 and are linked via overload reset button 15 and on/off switch 13 to AC outlets 9 and USB charging ports 17 in a parallel arrangement so as to provide power to said outlet and ports. Cylinders 38(*b*) are disposed within corresponding cylindrical openings 36(*g*) so as to electrically connect each of wires 2(*b*) to a corresponding wire 39, with the electrical connection maintained throughout the rotation of drum 36 relative to slip ring 38 due to the cylindrical shape. That is, regardless of the angular location of drum 36 relative to slip ring 38 resulting from the winding/unwinding of AC cord 2, the electrical connection between AC cord 2 and AC outlets 9 and USB charging ports 17 is maintained. Reset button 15 may be activated to reset the electronics should a conventional internal circuit breaker be opened due to excess current draw.

With reference to FIGS. 11-14, latch mechanism 20 includes stacking latch body 21 which is pivotably mounted about stacking pins 23(*a*) and 23(*b*), which are inserted through lateral left and right openings formed in stacking latch body 21. Stacking pins 23(*a*) and 23(*b*) are further inserted at their opposite ends into holes formed in recessed area 3(*a*) so as to pivotably mount stacking latch body 21 onto upper housing 3. Stacking latch spring 22 includes lateral coil sections 22(*a*) and 22(*b*) and bridge area 22(*c*). Lateral coil sections 22(*a*) and 22(*b*) are fitted onto stacking pins 23(*a*) and 23(*b*) respectively, and stacking latch body 22 is assembled into recessed area 3(*a*) with bridge section 22(*c*) rotated downwardly and trapped against the body of upper housing 3 so as to provide a spring bias outwardly on stacking latch body 21 adjacent the lower boundary thereof. Therefore, the upper edge of stacking latch body 21 is biased inwardly relative to upper housing 3.

Stacking latch body 21 further includes first and second primary hooks 26(*a*) and 26(*b*) extending inwardly from the upper edge thereof, with vertical through opening 26(*c*) formed therebetween. First and second primary hooks 26(*a*) and 26(*b*) slope downwardly in the inward direction relative to upper housing 3. Intermediate projecting surface 27 extends inwardly from a central location of stacking latch body 21 and has lateral openings 27(*a*) formed therethrough to receive stacking pins 23(*a*) and 23(*b*), as well vertical through opening 27(*b*) which is aligned with and is vertically below opening 26(*c*). Lower projecting ledge 29 is disposed below intermediate projecting surface 27 and includes spring support surface 29(*a*) having circular spring opening 29(*d*) therein. Spring support surface 29(*a*) is disposed below and in line with vertical opening 27(*b*) and vertical opening 26(*c*). Through hole 28 is defined within lower projecting ledge 29 inward of spring support surface 29(*a*). Catch ledges 29(*b*) extend inwardly from stacking latch body 21 and downwardly from the lower surface of lower projecting ledge 29, laterally outward of through hole 28. Stopper support surface 29(*c*) extends inwardly from stacking latch body 21 below vertical opening 27(*b*) and through hole 28, laterally inward of catch ledges 29(*b*).

Stacking latch stopper 24 includes a main body having integrally formed spring tabs 24(*a*) on either side thereof and upper contact surface 24(*b*). Coil spring 25 is disposed within a central volume of stacking latch stopper 24 with its lower end disposed within circular spring opening 29(*d*). Stacking latch stopper 24 is disposed on latch body 21 by being fitted through openings 26(*c*) and 27(*c*), with tabs 24(*a*) being forced radially inward to allow them to pass through hole 28. Tabs 24(*a*) then flexing outwardly to catch beneath catch ledges 29(*b*) to secure stopper 24 in place on stacking latch body 21, with coil spring 25 biasing latch stopper 24 upwardly such that tabs 24(*a*) come into contact with catch ledges 29(*b*). Stopper support surface 29(*c*) limits movement of latch stopper 24 downwardly and out of opening 27(*b*). A slight clearance is maintained between the lower surface of latch stopper 24 and stopper support surface 29(*c*) due to the upward bias of coil spring 25.

Figure 8A:
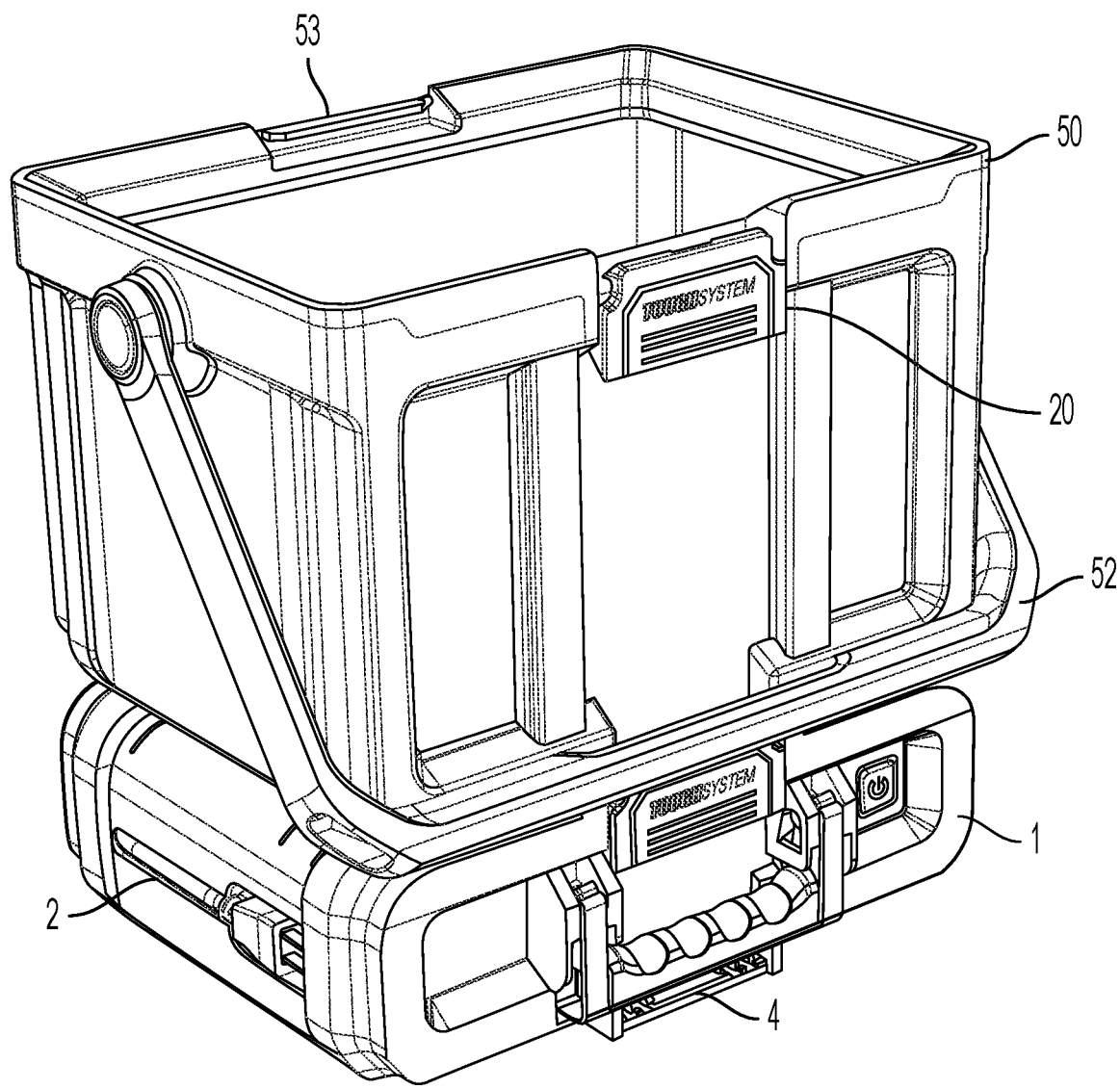
FIG. 8A is a perspective view showing a stackable power outlet box of FIG. 1 attached to a storage container forming part of the invention.
Figure 8B:
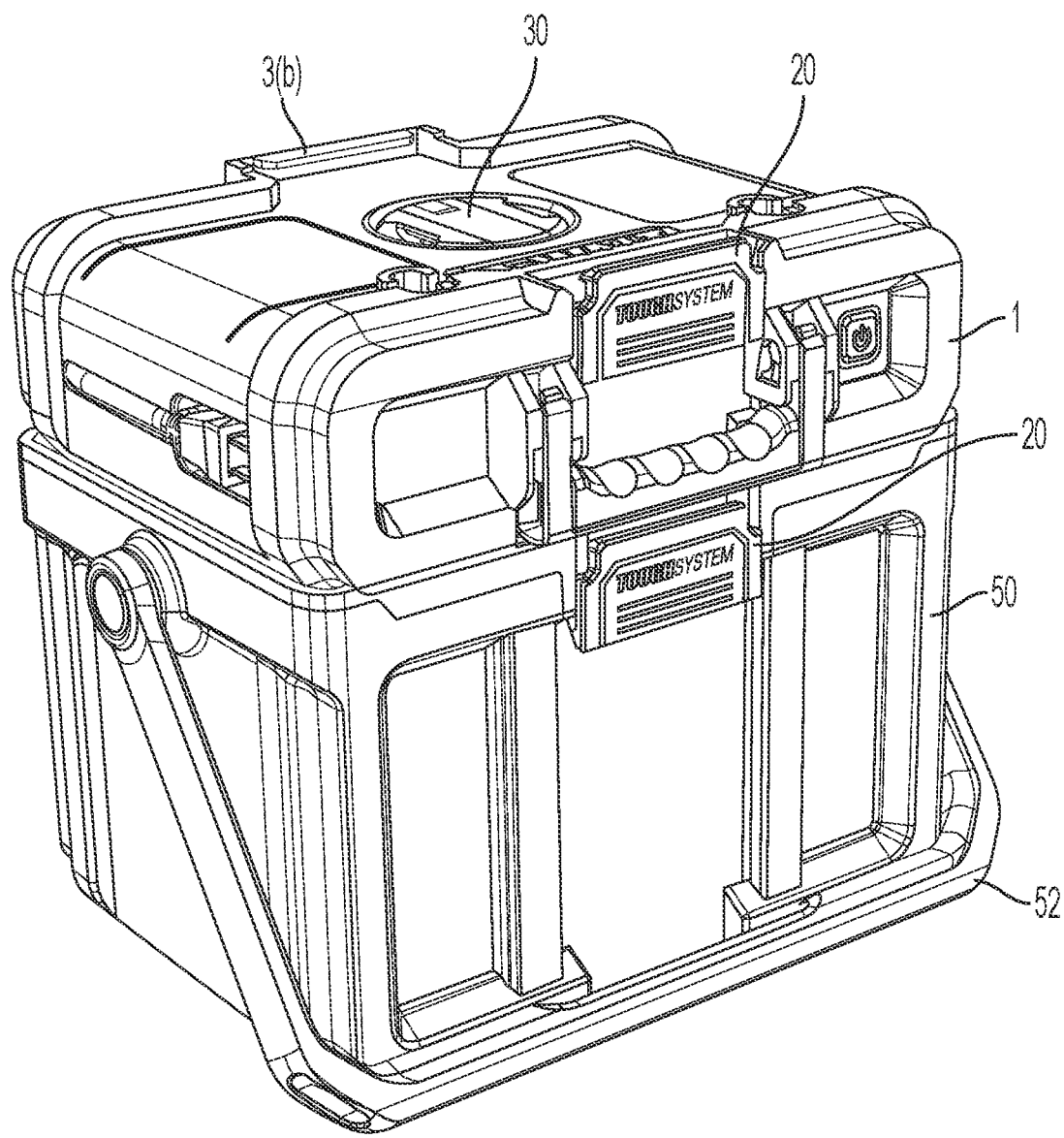
FIG. 8B is a perspective view showing a stackable power outlet box of FIG. 1 attached to a storage container forming part of the invention in a second orientation.
Figure 8C:
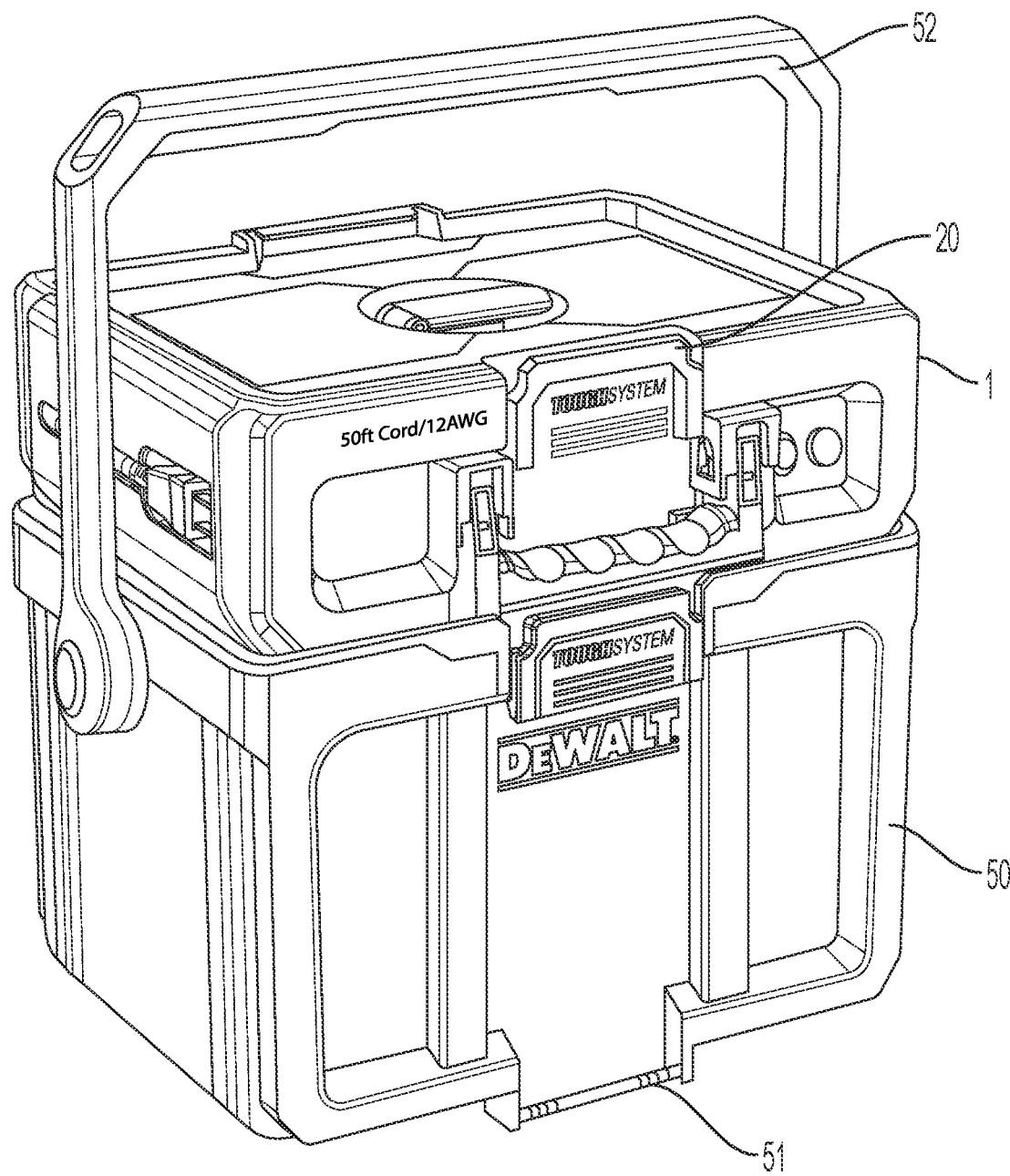
FIG. 8C is a perspective view showing a stackable power outlet box as shown in FIG. 8A with the handle in a different orientation.

With reference to FIGS. 8A-8C, storage container 50 forming part of the invention is disclosed. Storage container 50 includes step 51 which is substantially identical in structure to step 4 of stackable power outlet box 1 and which extends from a central lower surface of one side wall, in this case a long side wall, and latch mechanism 20 as described above with reference to stackable power outlet box 1 is disposed at the upper surface of the side wall. Though not shown, further step 51 would be formed on the opposite lower side wall. As shown, overhanging retaining hook ledge 53 is disposed on the upper side surface opposite latch mechanism 20. Though not shown, a further latch mechanism 20 could be disposed on the opposite site wall in place of hook ledge 53. Storage container 50 has an open top surface. Handle 52 is pivotably secured at opposite side walls of storage container 50, in this case the short side walls. Handle 52 may be pivoted from a lower position for example as shown in FIG. 8A-8B where it is located along the lower side of storage container 50 to an upper position as shown in FIG. 8C where it is located above the open top surface of storage container 50. Sufficient clearance is provided so that power outlet box 1 may be disposed within the open upper surface of storage container 50 with handle 52 disposed there above so as to allow both storage container 50 and stackable power outlet box 1 to be simultaneously carried by a user holding handle 52.

With further reference to FIGS. 11-14, stackable power outlet box 1 may be secured on container 50 in the configuration shown in FIG. 8B by disposing it into the upper open surface of container 50 which has similar overall dimensions. When power outlet box 1 is disposed on container 50, one of steps 4 is secured under hook ledge 53 of storage container 50, and the other of steps 4 contacts primary hooks 26(a) and 26(b) of latch mechanism 20 formed on container 50 and thereby forces the upper portion of stacking latch body 21 to pivot outwardly about stacking pins 23(a) and 23(b), against the inward bias of stacking latch spring 22, and away from the upper open surface of container 50. The outward movement is sufficient to allow step 4 to pass by primary hooks 26(a) and 26(b) and to come to rest on upper contact surface 24(b) of stacking latch stopper 24 and intermediate projecting surface 27. Simultaneously, primary hooks 26(a) and 26(b) are biased back inwardly by stacking latch spring 22 so as to rest over the upper surface of step 4, thereby securing power outlet box 1 on top of container 50 so that it cannot move vertically off of container 50, with the side surface of latch body 21 and hook ledge 53 precluding lateral motion. The contact of step 4 with upper surface 24(b) of latch stopper 24 causes latch stopper 24 to move slightly downwardly against the upward spring bias provide by coil spring 25, with its downward movement limited by stopper support surface 29(c).

In order to release stackable power outlet box 1, stacking latch body 21 is pushed inward at its lower portion so that the upper portion is again pivoted outwardly against the spring bias such that primary hooks 26(a) and 26(b) are moved to a location where they are not located above step 4. Since primary hooks 26(a) and 26(b) are no longer in contact with step 4, the upward bias of coil spring 25 against latch stopper 24 acts upon step 4 to causes a slight upward movement of step 4 and stackable power outlet box 1 such that step 4 is disposed inwardly of and at the same level as primary hooks 26(a) and 26(b), preventing them from returning to their latching position once the user pushes stacking latch body 21. The user can then lift stackable power outlet box 1 off of container 50 without having to maintain inward pressure on stacking latch body 21, and with opposite ledge 4 moving slightly inward and clear of hook ledge 53.

Although the invention described above with respect to FIGS. 8B-8C included container 50 having latch mechanism 20 and hook ledge 53, container 50 could also include a second latch mechanism 20 disposed in place of hook ledge 53. Both latch mechanisms 20 would operate as described above when stackable power outlet box 1 is disposed on container 50. Additionally although stackable power outlet box 1 was described above as being disposed upon container 50, the reverse orientation is also possible. For example, as shown in FIG. 8A, container 50 can be disposed upon and secured to the upper surface of stackable power outlet box 1. This is made possible by the fact that both stackable power outlet box 1 and container 50 have steps 4 or 51 formed on their lower edges and latch mechanisms 20 (or alternatively one latch mechanism 20 and one hook ledge 3(b) or 53 disposed on their upper edges.) In either orientation, handle 52 can be used to jointly transport container 50 and stackable power outlet box 1.

Figure 9A:
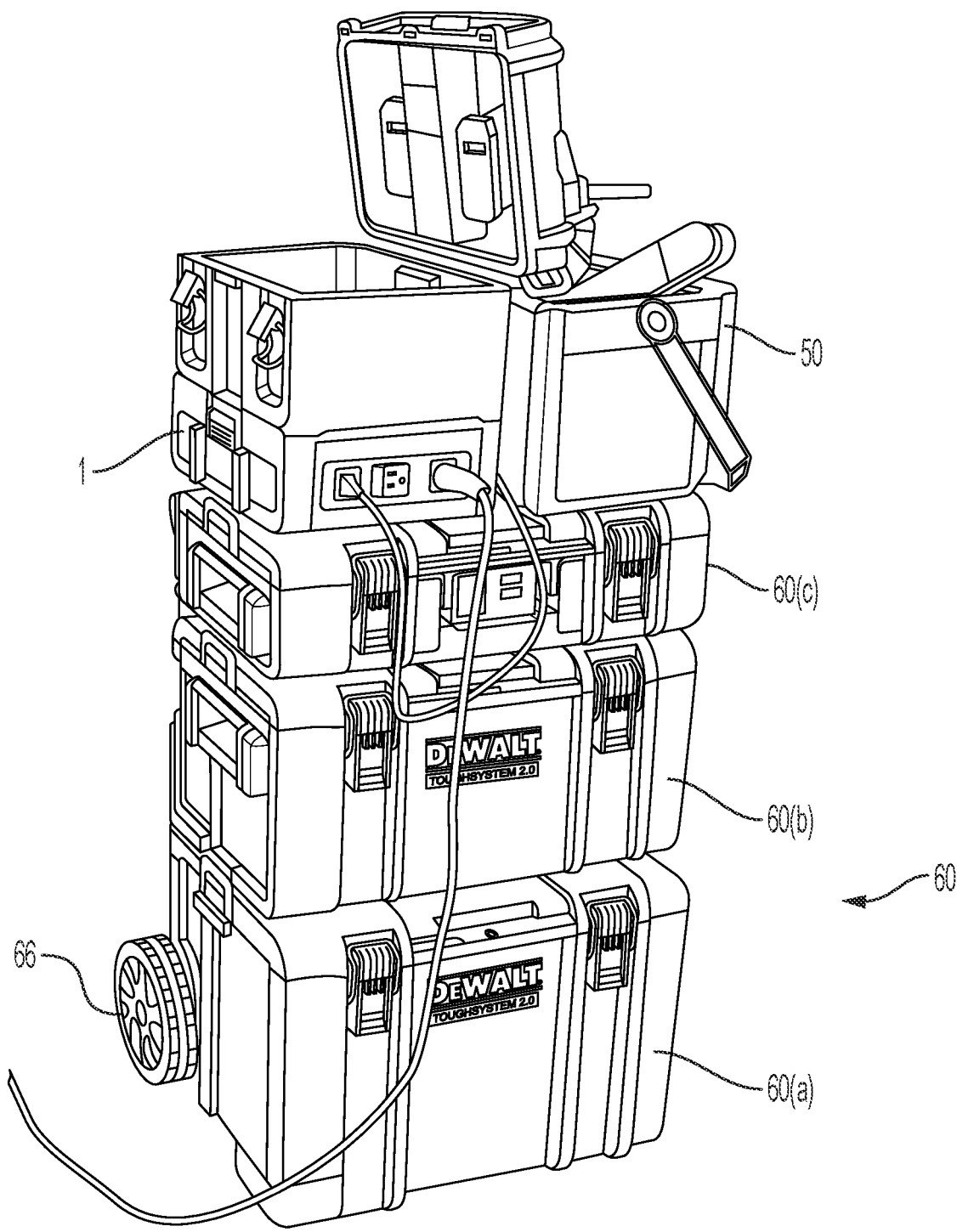
FIG. 9A perspective view of a stackable storage system forming part of the invention and having the stackable power outlet box as shown in FIG. 1 disposed therein.
Figure 9B:
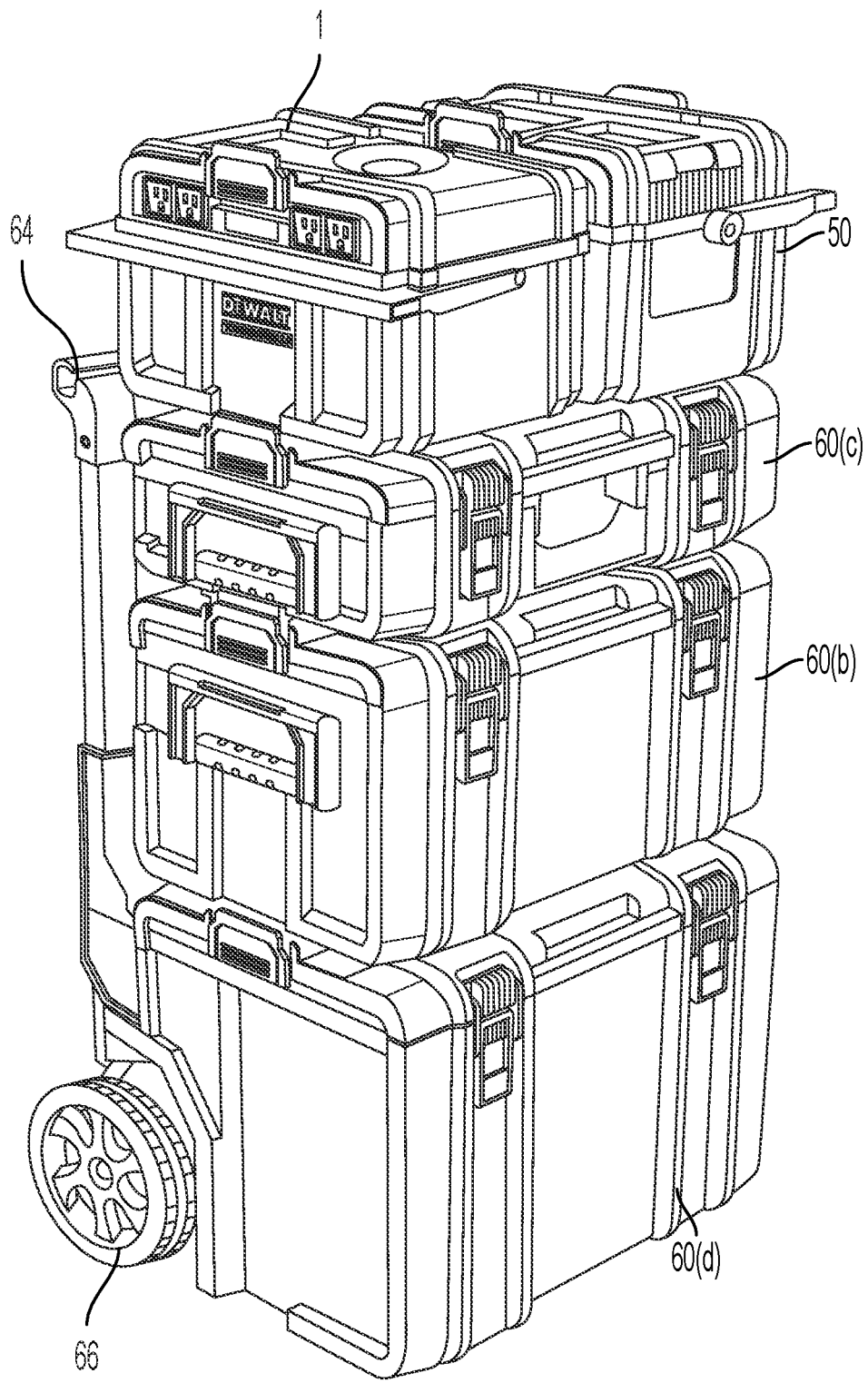
FIG. 9B is a perspective view of a stackable storage system as shown in FIG. 9A.

With reference to FIGS. 9A-9B, a stackable storage system forming a further embodiment of the invention is disclosed. Stackable storage system 60 includes a plurality of stackable storage containers 60(a), 60(b) and 60(c), of varying sizes, each of which includes a lid having latch mechanism 20 disposed thereon to secure the lid to the base of the storage container disposed thereon. Container 60(a) is the lowest container of the stack and may be integrally formed with wheels 66 and an upright pull handle 64 to allow stackable storage system 60 to be transported by tilting and rolling. Alternatively, lowest container 60(a) can be attachable to a wheeled carriage having an upright pull handle. Stackable power outlet box 1 can be disposed on top of upper container 60(c) of the stack of containers, and secured thereto via latch mechanism 20 of container 60(c) and step 4 of power outlet box 1. A further container 60(d) may be secured on top of power outlet box 1. In each case, AC outlets 9 and USB charging ports 17 are available for use.

Figure 10B:
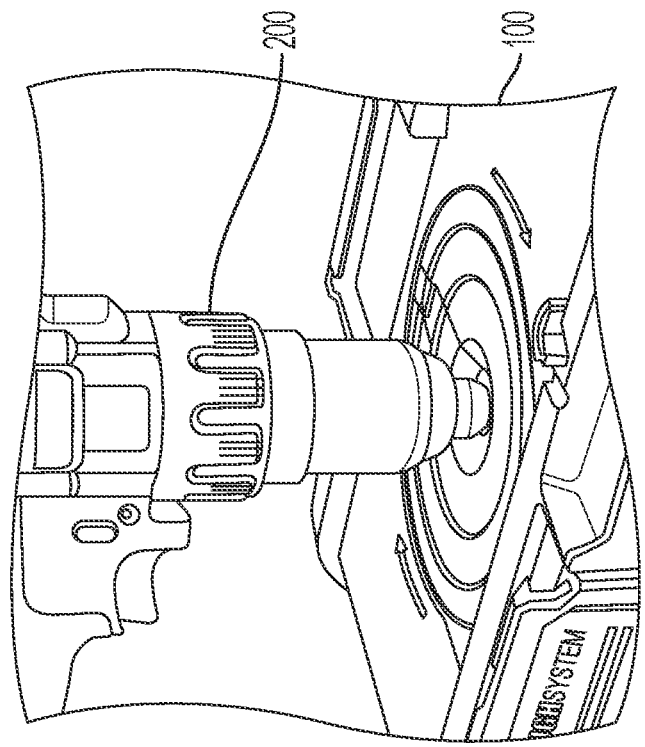
FIG. 10B is a close-up perspective view of a drill engaging a stackable power outlet box according to an embodiment of the invention.
Figure 10A:
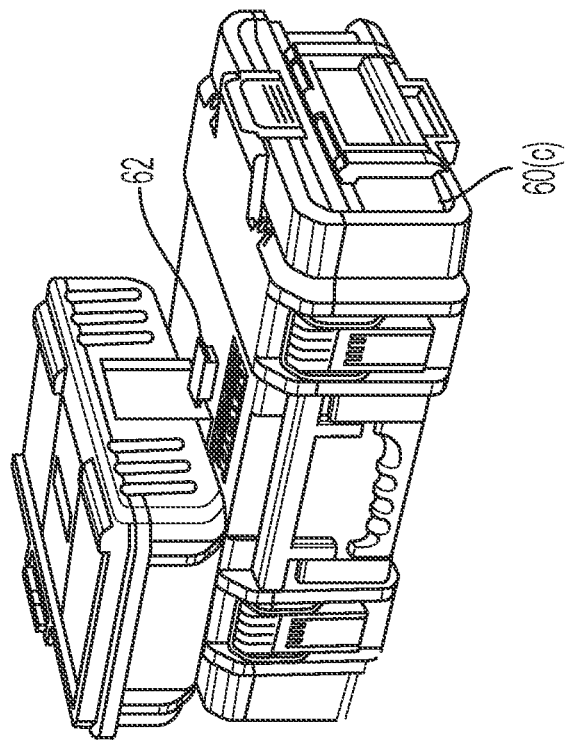
FIG. 10A is perspective view of components of a stackable storage system forming part of the prior art.
Figure 11:
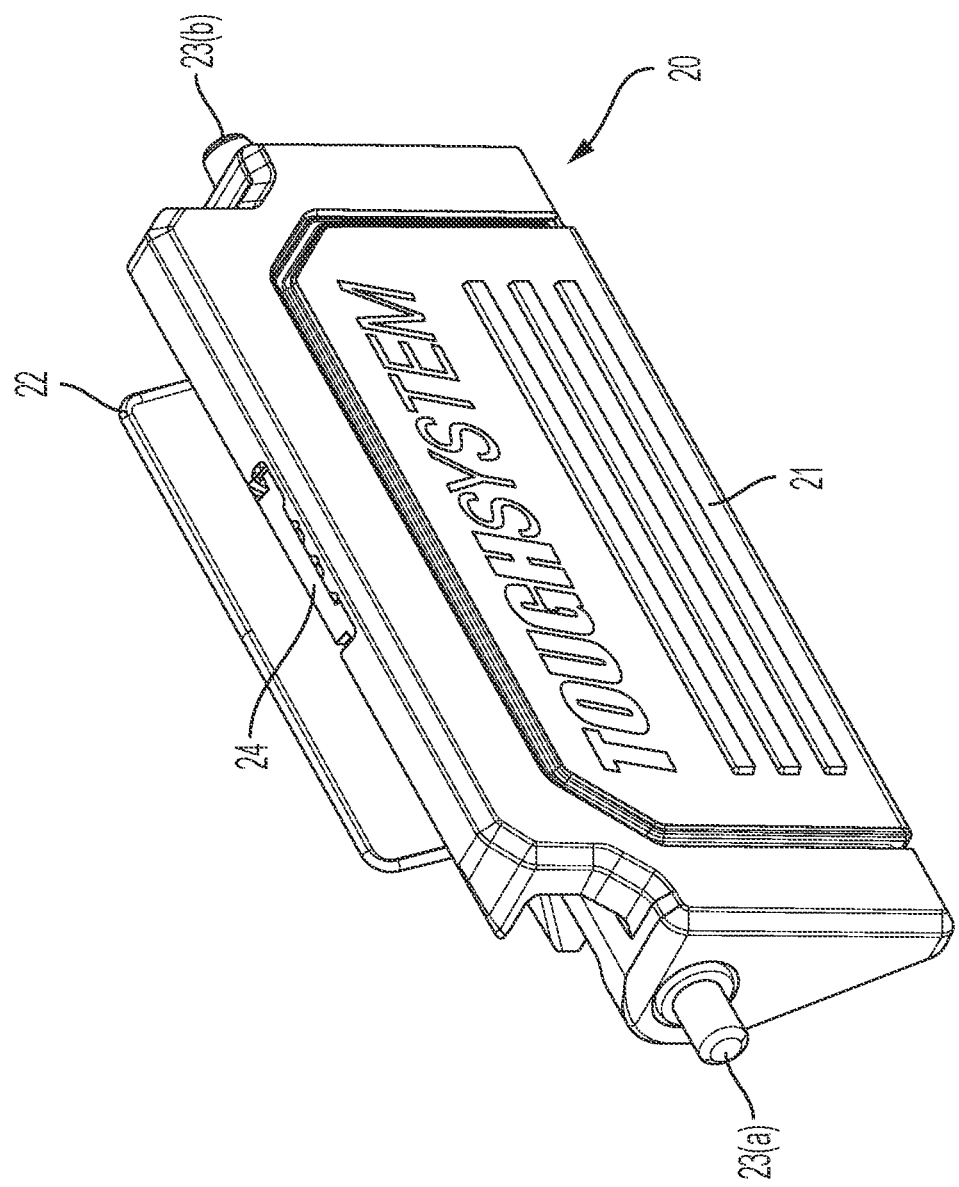
FIG. 11 is a perspective view of a latching mechanism forming part of the stackable power outlet box as shown in FIG. 1.
Figure 12:
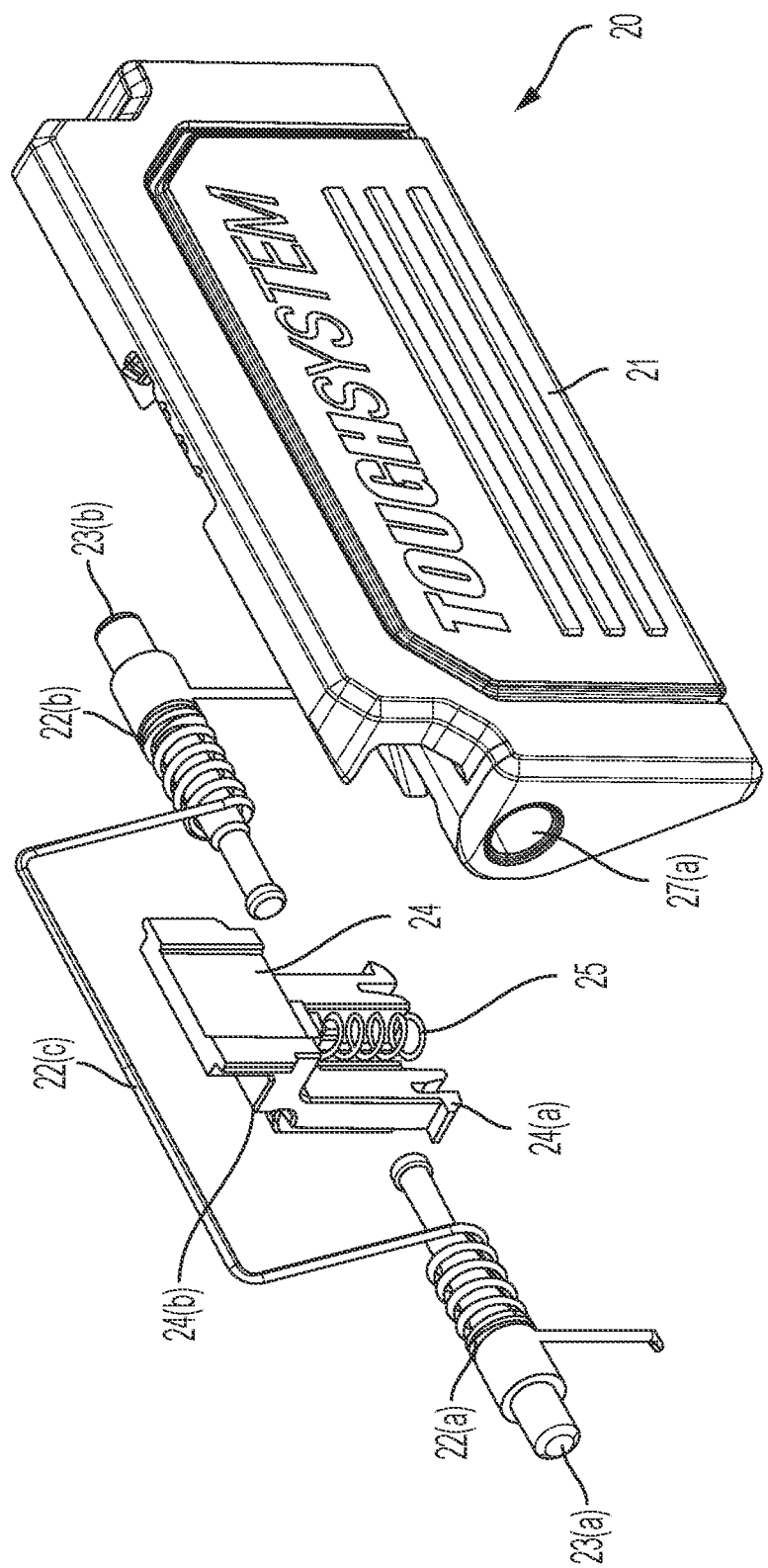
FIG. 12 is an exploded view of the latching mechanism shown in FIG. 11.
Figure 13:
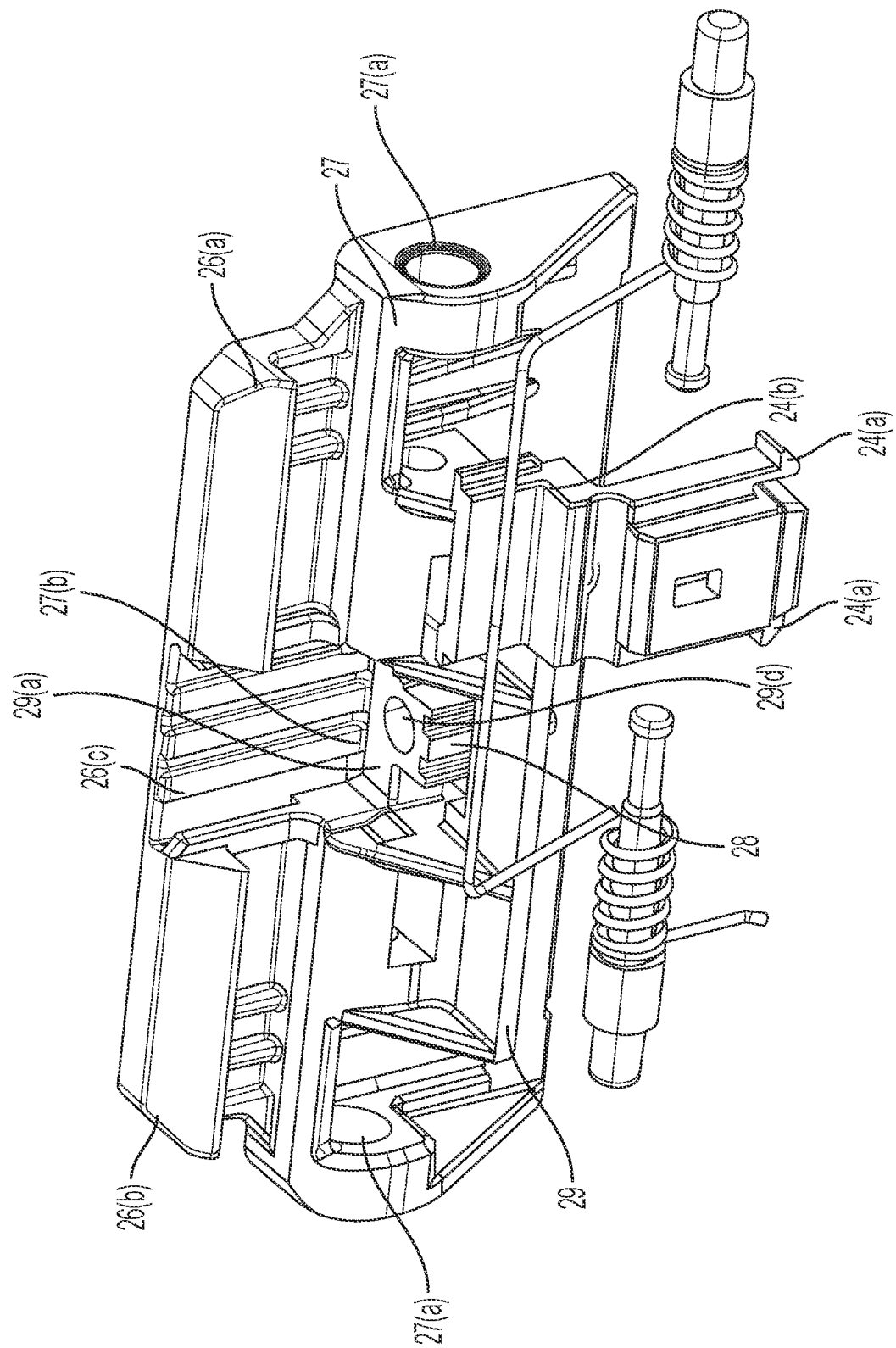
FIG. 13 is an opposite side exploded view of the latching mechanism shown in FIG. 11.
Figure 14:
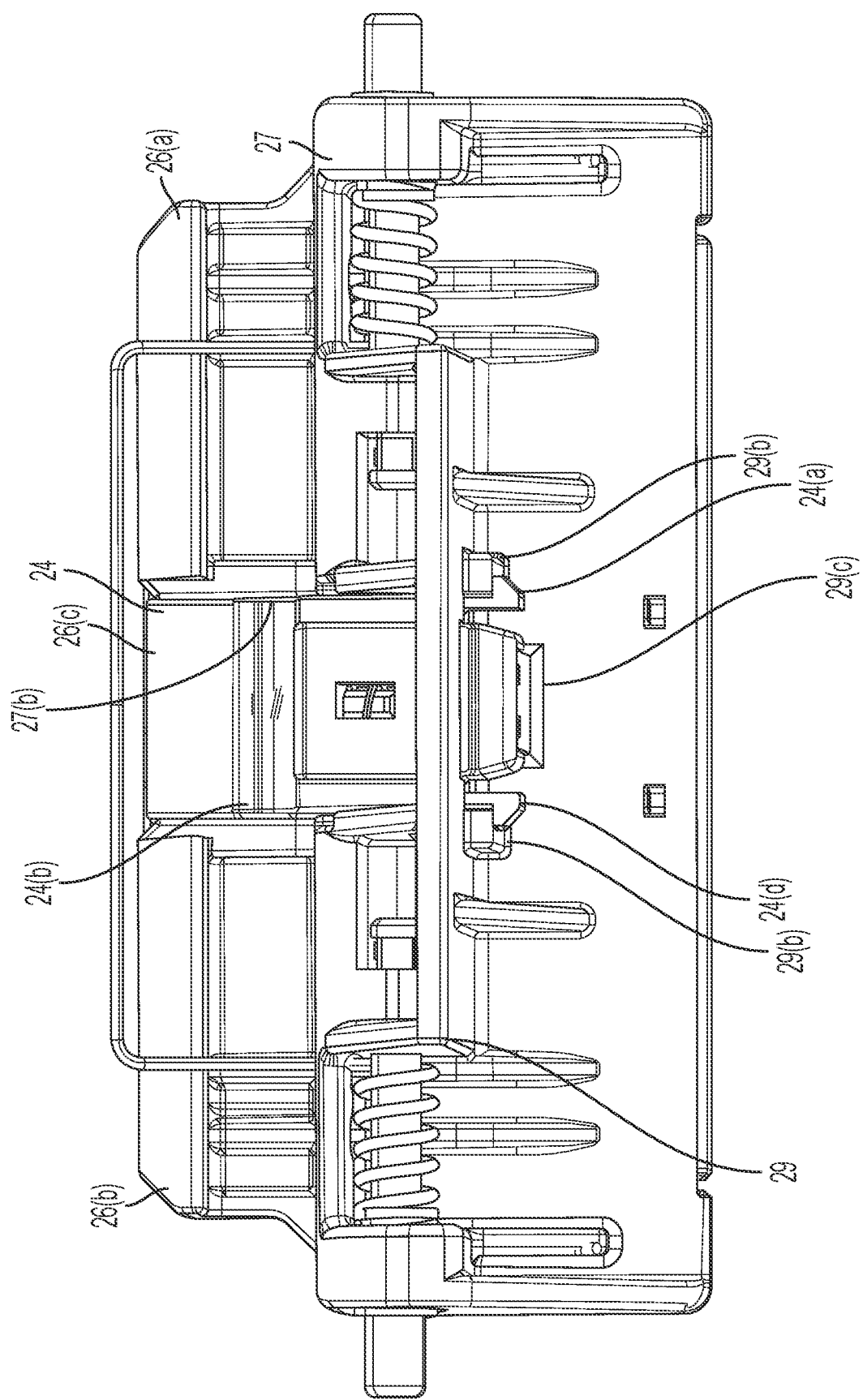
FIG. 14 a side view of the latching mechanism shown in FIG. 11.

In the embodiment described with reference to FIG. 9A-9B power outlet box 1 is formed to have a dimension of its short sides 8(a) which is about half the width of containers 60(a),60(b) and 60(c). Therefore, power outlet box 1 is secured across the depth of the stack and extends about one half of the width, allowing stackable power outlet box 1 and storage container 50 (or a further half width container) to be stacked side by side on the top of container 60(c). With reference to FIG. 10A, container 60(c) includes raisable T-Bar 62 which is known in the prior art and has two overhanging latches which fit over steps 4 of power outlet box 1 or step 51 of storage container 50 in order to secure their laterally inner sides. The outer sides of power outlet box 1 and storage container 50 are secured by stacking latch mechanism 20 as described above. Though stackable power outlet box 1 is shown as disposed as the top most element of the stack, it could also be disposed within the stack, for example, between storage containers 60(b) and 60(c), in a side by side relationship with a half sized storage container.

Figure 15:
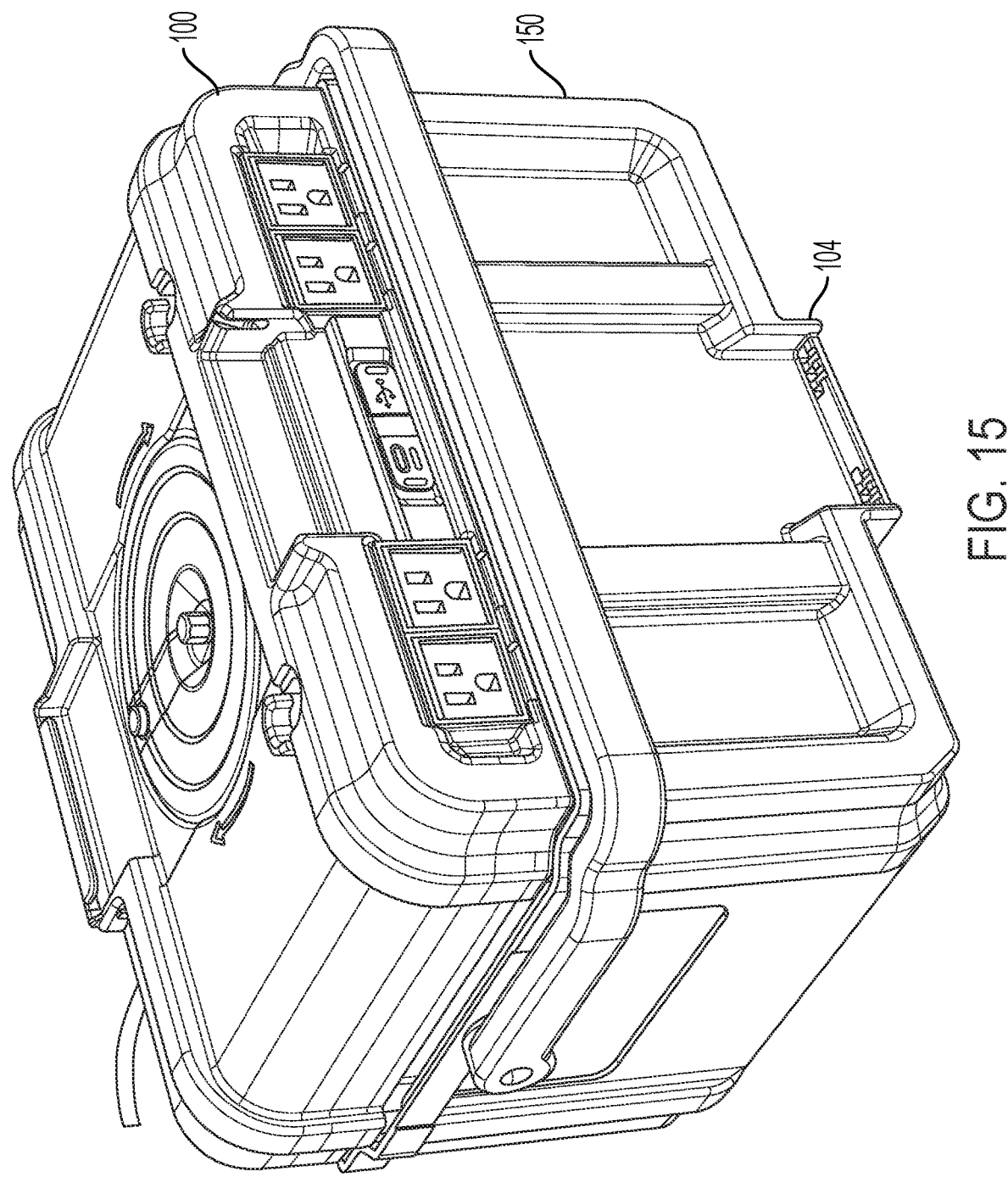
FIG. 15 is a top perspective view of a stackable power outlet box according to a second embodiment of the invention.
Figure 16:
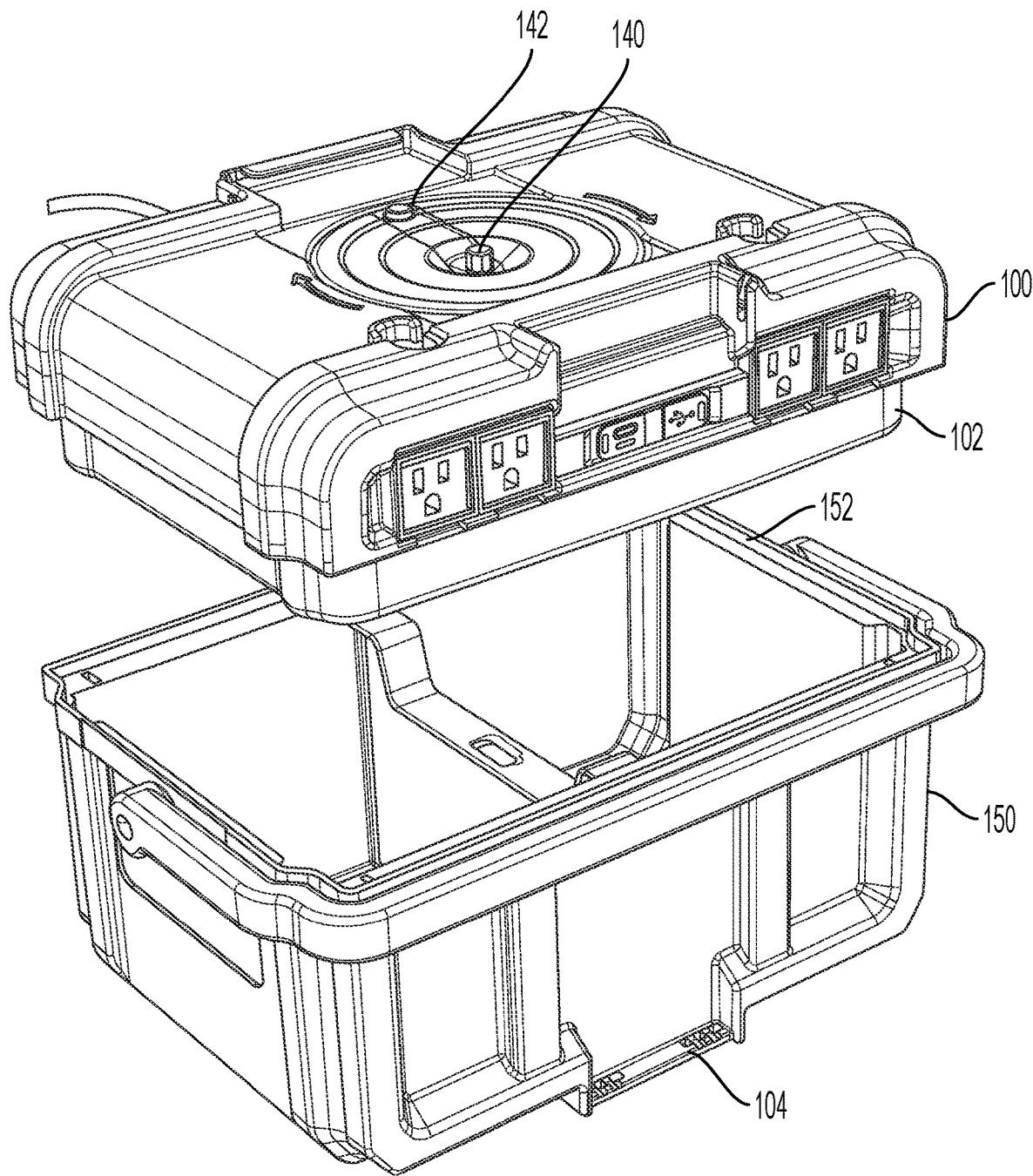
FIG. 16 an exploded perspective view of the stackable power outlet box shown in FIG. 15.

With reference to FIGS. 15 and 16, a further embodiment of the invention is shown. Stackable power box 100 includes lower wall 102 extending around the lower periphery thereof at a radially inward location. Container 150 includes ridge 152 extending around the upper inner periphery thereof. Container 150 includes step 104. Power outlet box 100 may be disposed upon container 150 by inserting lower wall 102 within ridge 152 to provide a friction fit. Power outlet box 100 also includes upper drive nut 140 which is linked to a drum similar to drum 36 described above. Winding handle 142 is attached to the drum via drive nut 140. AC outlets 109 and USB ports 117 are disposed in the long side wall of power box 100. In all other respects, power box 100 is identical to power outlet box 1 described above. As shown in FIG. 10B, drum 36 can be driven by power tool 200 such as a drill which is engaged with drive nut 140 to rewind AC cord 2.

In a further embodiment, the power outlet box can be rewound by an on-board motor attached to drum 36. Further, a battery may be disposed on power outlet box to power the electrical outlets. Alternatively, automated retraction may be provided by a spring.

In a further embodiment, assisted manual winding may be provided by using a gear.

In a further embodiment, a clutch mechanism may be provided to avoid winding in the wrong direction.

In a further embodiment, the power box may include a detachable AC cord which can be replace by an extension cord.

In a further embodiment, AC outlets 9 can be electrically attached to a further electrical cord which can be extended outwardly from side 8(*a*) such that AC outlets 9 can be removably attached within one or more openings formed in lower housing 5, and be pulled out and located a distance away therefrom. The further electrical cord would fit and be stored within lower housing 5 and behind AC outlets 9 when AC outlets 9 are placed back in the appropriate openings formed in housing 5 for storage. The further electrical cord is connected to on/off button 13 via electrical wires.

While the invention has been described by way of exemplary embodiments, it is understood that the words which have been used herein are words of description, rather than words of limitation. Changes may be made within the purview of the appended claims, without departing from the scope and spirit of the invention in its broader aspects.

The invention claimed is:

1. A power outlet box, comprising:
   an outlet box housing including an opening and an upper surface;
   a rotatable drum disposed in said outlet box housing;
   a power cord windable about said rotatable drum and including an AC plug at one end, said power cord disposed through said opening and extendable with said rotatable drum rotating in an unwinding direction;
   at least one power outlet disposed on said outlet box housing and electrically powered by said power cord when said AC plug is inserted in a wall outlet
   a winding handle body disposable within and raisable and lowerable relative to said rotatable drum; and
   a handle rotatably linked to said rotatable drum, said handle disposed on said winding handle body, wherein said handle is foldable between an unfolded position, in which said handle is configured to rotate and drive said winding handle body and said rotatable drum, and a folded position, in which said handle is disposed below said upper surface of said outlet box housing and in which said winding handle body is lowered within said rotatable drum.

2. The power outlet box of claim 1, wherein said rotatable drum further comprises an integral axial member extending through said upper surface and including a drivable head, said axial member drivable by an external power driver via said drivable head to drive the rotatable drum.

3. The power outlet box of claim 1, wherein said handle is fixed relative to said outlet box housing in said folded position and is rotatable relative to said outlet box housing in said unfolded position.

4. The power outlet box of claim 1, wherein said winding handle body comprises a channel disposed on an external surface thereof, and wherein said channel is configured to receive and store said handle.

5. The power outlet box of claim 4, wherein said handle is configured to lie flush with said external surface when stored in said channel.

6. The power outlet box of claim 1, wherein said winding handle body is raisable and lowerable relative to said rotatable drum along an axis orthogonal to said upper surface of said outlet box housing.

7. The power outlet box of claim 1, wherein said handle comprises a projection and a grip knob disposed thereon.

8. A power outlet box, comprising:
   an outlet box housing including an upper housing and a lower housing, said upper housing having a first opening formed therein and said lower housing having a second opening formed therein;
   a rotatable drum disposed in said outlet box housing;
   a power cord windable about said rotatable drum and including an AC plug at one end, said power cord disposed through said second opening and extendable with said rotatable drum rotating in an unwinding direction;
   at least one power outlet disposed on said outlet box housing and electrically powered by said power cord when said AC plug is inserted in a wall outlet; and
   a winding handle body coupled to said rotatable drum, said winding handle body having a handle disposed thereon, wherein said winding handle body is raisable and lowerable through said first opening relative to said rotatable drum, and wherein said handle is foldable relative to said winding handle body when said winding handle body is raised through said first opening.

9. The power outlet box of claim 8, wherein said handle is fixed relative to said winding handle body when said winding handle body is lowered through said first opening.

10. The power outlet box of claim 8, wherein said winding handle body comprises a channel disposed on an external surface thereof, and wherein said channel is configured to receive and store said handle.

11. The power outlet box of claim 10, wherein said handle is configured to lie flush with said external surface when stored in said channel.

12. The power outlet box of claim 8, wherein said winding handle body is raisable and lowerable relative to said rotatable drum along an axis orthogonal to an upper surface of said upper housing.

13. The power outlet box of claim 8, wherein said handle comprises a projection and a grip knob disposed thereon.

14. A power outlet box, comprising:
   an outlet box housing including an opening;
   a rotatable drum disposed in said outlet box housing;
   a power cord windable about said rotatable drum and including an AC plug at one end, said power cord disposed through said opening and extendable along a first axis with said rotatable drum rotating in an unwinding direction;
   at least one power outlet disposed on said outlet box housing and electrically powered by said power cord when said AC plug is inserted in a wall outlet;
   a winding handle body raisable and lowerable along a second axis relative to said rotatable drum, the second axis being different from the first axis; and
   a handle rotatably linked to said rotatable drum, said handle disposed on said winding handle body, wherein said handle is pivotable around a pivot rod extending orthogonal to the second axis when said winding handle body is raised above said rotatable drum.

15. The power outlet box of claim 14, wherein the power outlet box is removably securable to a cart, said cart having wheels and an upright handle extending therefrom.

16. The power outlet box of claim 14, wherein said handle is pivotable between an unfolded position, in which said handle is configured to rotate and drive said winding handle body and said rotatable drum, and a folded position, in which said handle is lowered within said rotatable drum.

17. The power outlet box of claim 14, wherein said winding handle body comprises a channel disposed on an external surface thereof, and wherein said channel is configured to receive and store said handle.

18. The power outlet box of claim 17, wherein said handle is configured to lie flush with said external surface when stored in said channel.

19. The power outlet box of claim 14, wherein said second axis is orthogonal to said first axis.

20. The power outlet box of claim 14, wherein said handle comprises a projection and a grip knob disposed thereon.

* * * * *